(12) United States Patent
Gurajada et al.

(10) Patent No.: US 11,119,997 B2
(45) Date of Patent: Sep. 14, 2021

(54) LOCK-FREE HASH INDEXING

(71) Applicant: SAP SE, Walldorf (DE)

(72) Inventors: Aditya Gurajada, Hyderabad (IN); Zhan-feng Ma, Shanghai (CN); Zhi-ping Xiong, Shanghai (CN)

(73) Assignee: SAP SE, Walldorf (DE)

( * ) Notice: Subject to any disclaimer, the term of this patent is extended or adjusted under 35 U.S.C. 154(b) by 413 days.

(21) Appl. No.: 15/908,727

(22) Filed: Feb. 28, 2018

(65) Prior Publication Data

US 2018/0349374 A1 Dec. 6, 2018

Related U.S. Application Data

(60) Provisional application No. 62/521,513, filed on Jun. 18, 2017.

(30) Foreign Application Priority Data

Mar. 1, 2017 (IN) .............................. 201741007221

(51) Int. Cl.
*G06F 17/30* (2006.01)
*G06F 16/22* (2019.01)
(Continued)

(52) U.S. Cl.
CPC .......... *G06F 16/2255* (2019.01); *G06F 3/061* (2013.01); *G06F 3/0604* (2013.01);
(Continued)

(58) Field of Classification Search
CPC .. G06F 16/2255; G06F 16/22; G06F 16/2272; G06F 16/27; G06F 16/2379;
(Continued)

(56) References Cited

U.S. PATENT DOCUMENTS 6,023,744 A 2/2000 Shoroff
6,041,344 A 3/2000 Bodamer
(Continued)

OTHER PUBLICATIONS

Ailamaki, Anastassia, et al., "DBMSs on a modern processor: Where does time go?." *VLDB" 99, Proceedings of 25th International Conference on Very Large Data Bases*, Sep. 7-10, 1999, Edinburgh, Scotland, UK. No. DIAS-CONF-1999-001. 1999 (12 pages).

(Continued)

*Primary Examiner* — Huawen A Peng
(74) *Attorney, Agent, or Firm* — Mintz Levin Cohn Ferris Glovsky and Popeo, P.C.

(57) ABSTRACT

A system for an in-memory row storage architecture can be provided. In some implementations, the system performs operations comprising adding a data row to an in-memory row store at a row location based on a database operation, indexing the row location in an index table comprising a plurality of nodes for a plurality of rows in the in-memory row store, the plurality of nodes organized across a plurality of buckets, and accessing the data row at the row location in the in-memory row store based on the index table to perform another database operation on the data row Related systems, methods, and articles of manufacture are also described.

17 Claims, 18 Drawing Sheets

(51) Int. Cl.
  *G06F 11/14* (2006.01)
  *G06F 16/27* (2019.01)
  *G06F 16/23* (2019.01)
  *G06F 3/06* (2006.01)
  *G06F 12/02* (2006.01)

(52) U.S. Cl.
  CPC ............ *G06F 3/065* (2013.01); *G06F 3/0644* (2013.01); *G06F 3/0653* (2013.01); *G06F 3/0673* (2013.01); *G06F 11/1471* (2013.01); *G06F 11/1474* (2013.01); *G06F 12/0253* (2013.01); *G06F 16/22* (2019.01); *G06F 16/2272* (2019.01); *G06F 16/2282* (2019.01); *G06F 16/2379* (2019.01); *G06F 16/27* (2019.01); *G06F 2201/80* (2013.01); *G06F 2201/82* (2013.01); *G06F 2212/1044* (2013.01)

(58) Field of Classification Search
  CPC .... G06F 16/2282; G06F 3/0604; G06F 3/061; G06F 3/0644; G06F 3/065; G06F 3/0653; G06F 3/0673; G06F 11/1471; G06F 11/1474; G06F 12/0253
  See application file for complete search history.

(56) References Cited

U.S. PATENT DOCUMENTS

| | | | |
|---|---|---|---|
| 9,052,942 B1 | 6/2015 | Barber | |
| 9,405,788 B2 | 8/2016 | Kliewe | |
| 9,600,501 B1 | 3/2017 | Fuller | |
| 2010/0138456 A1* | 6/2010 | Aghili | G06F 16/2255 707/803 |
| 2014/0330801 A1* | 11/2014 | Kaldewey | G06F 16/2255 707/698 |
| 2014/0365425 A1 | 12/2014 | Zhao | |
| 2015/0074041 A1 | 3/2015 | Bhattacharjee | |
| 2017/0031976 A1* | 2/2017 | Chavan | G06F 16/23 |
| 2017/0147618 A1 | 5/2017 | Geissinger | |

OTHER PUBLICATIONS

Diaconu, Cristian, et al., "Hekaton: SQL server's memory-optimized OLTP engine." *Proceedings of the 2013 ACM SIGMOD International Conference on Management of Data.* ACM, 2013 (12 pages).

Grund, Martin, et al., "HYRISE: A Main Memory Hybrid Storage Engine." *Proceedings of the VLDB Endowment* 4.2 (2010): 105-116 (12 pages).

Harizopoulos, Stavros, et al., "OLTP Through the Looking Glass, and What We Found There." *Proceedings of the 2008 ACM SIGMOD international conference on Management of data.* ACM, 2008, pp. 981-992.

Hertz, Matthew, and Emery D. Berger, "Quantifying the performance of garbage collection vs. explicit memory management." ACM SIGPLAN Notices. vol. 40. No. 10. ACM, 2005 (14 pages).

Johnson, Ryan, et al., "Shore-MT: a scalable storage manager for the multicore era." *Proceedings of the 12th International Conference on Extending Database Technology: Advances in Database Technology.* ACM, 2009, pp. 24-35.

Oracle, "Using Oracle TimesTen Application-Tier Database Cache to Accelerate the Oracle Database," Oracle White Paper, Oct. 2014 (24 pages).

Oracle, "Guide to Database Performance and Tuning: Row Cache Enchancements, A feature of Oracle Rdb," Aug. 2003 (14 pages). [online] Available at: http://www.oracle.com/technetwork/products/rdb/0308-row-cache-712a-134300.pdf.

Robertz, Sven Gestegard, and Roger Henriksson, "Time-triggered garbage collection: robust and adaptive real-time GC scheduling for embedded systems." ACM SIGPLAN Notices. vol. 38. No. 7. ACM, 2003 (10 pages).

SAP, "Performance Scalability Enhancements in SAP Adaptive Server Enterprise: A Discussion on Scalability Enhancements in SAP ASE 16.0," 2014 (27 pages). [online] Available at: https://assets.cdn.sap.com/sapcom/docs/2015/08/1078f9b9-567c-0010-82c7-eda71af511fa.pdf#pdfjs.action=download.

SAP, "Release Bulletin for HP-UX," Sep. 3, 2015 (20 pages) [online] Available at: https://help.sap.com/doc/a61700aabc2b1014a7b69a11c72a0364/16.0.2.0/en-US/SAP_ASE_Release_Bulletin_HP_en.pdf.

SAP, *What's New in SAP ASE 16 SP02.* 2016 (38 pages) [online] Available at: https://www.sap.com/documents/2016/06/02a21e18-767c-0010-82c7-eda71af511fa.html.

Sikka, Vishal, et al., "Efficient transaction processing in SAP HANA database: the end of a column store myth." *Proceedings of the 2012 ACM SIGMOD International Conference on Management of Data.* ACM, 2012, pp. 731-741.

Stonebraker, Michael, et al., "The end of an architectural era:(it's time for a complete rewrite)." *Proceedings of the 33rd international conference on Very large data bases.* VLDB Endowment, 2007 (10 pages).

* cited by examiner

700

```
Function imrs_generate_vrid (Database d, Partition p, ProcessId pid):
    /* get in-memory page for this thread. */
    partition_vrid = get_in_memory_page(p, pid)

/* page is not yet created or full */
    if (partition_vrid->page_no == 0) {
        /*
        ** reserve next page number to use within database for this partition.
        ** Use Compare and Swap to replace last known page id with next
        ** page id. If compare and swap succeeds this partition gets next_page_id
        ** as page number for use in this partition.
        */
        do
        {
            last_page_id = d->last_generated_pageid
            next_page_id = last_page_id + 1;
        while (COMPARE_AND_SWAP(d->last_generated_pageid, last_page_id, next_page_id);
            partition_vrid = (next_page_id, 0);
        }

/* insert a row in page in partition vrid. */
    do
    {
        last_rid_used = partition_vrid;
        next_rid = last_rid_used;
        next_rid.row_num = last_rid_used.row_num + 1;
    } while (COMPARE_AND_SWAP(partition_vrid, last_rid_used, next_rid);

return next_rid;
}
```

FIG. 7

Active hash node chain vs deleted hash node chain

1400

```
HCB_NODE *
hcb_find(HCB_SRCHRQST *hcb_srchrqst)
{
        if (hash table of this index ptn is empty)
        {
                stop and return NULL
        }
        else if (if the hash bucket is emptry)
        {
                stop and return NULL
        } get the first hash node do {
                compare this hash node with search request if (this hash node preceeds search request)
                {
                        get to next hash node if (at end of hash chain)
                        {
                                save current hash node (NULL) and its prev node
                                set flag telling end of hash chai
                                stop and return
                        }
                        else
                        {
                                continue
                        }
                }
                else if (this hash node follows search request)
                {
                        save current hash node and it's prev node if (current hash node is the first node of hash chain)
                        {
                                set the status telling the beginning of hash chahin (prev node is NULL)
                        } stop and return
                }
                else if (this hash node equals search request)
                {
                        save current hash node and it's prev node
                        set the status indicating matching node is found
                        stop and return
                }
        } while (TRUE)
}
```

FIG. 14

```
1500 int hcb_insert(SDES *sdes, INDEX *indptr, PARTITION *ptnptr, BYTE *rowptr,
        PDES *pdes, SYB_BOOLEAN from_scan, BT_RID *btrid)
{
    if (hash table is not initialized)
    {
        stop and return
    }
    calculate hash value using index key columns in data row
    construct a new hash node that contain (hash value, data row ID)
retry:
    call hcb_find() to find the insert position
    if (hash bucket is empty)
    {
        if (CAS(bucket_ptr, NULL, addr_new_hash_node) == FAIL)
        {
            go to retry to find a new insert position
        } else {
            insert succeed ang return
        }
    }
    else if (hash but is not emptry, but insert position is beginning)
    {
        if (CAS(bucket_ptr, addr_old_1st_node, addr_new_hash_node) == FAIL)
        {
            go to retry to find a new insert position
        } else {
            insert succeed ang return
        }
    }
    else if (hash but is not emptry, insert position after the last hash node)
    {
        if (CAS(next_ptr_of_last_node, NULL, addr_new_hash_node) == FAIL)
        {
            go to retry to find a new insert position
        } else {
            insert succeed ang return
        }
    }
    else if (hash node with the same (hash value, data row ID) is found)
    {
        free the new hash node
        stop and return
    }
    else if (insert position is in the middle of hash chain)
    {
        if (CAS(next_node_ptr_of_prev_node, addr_cur_hash_node, addr_new_hash_node) == FAIL)
        {
            go to retry to find a new insert position
        } else {
            insert succeed ang return
        }
    }
}
```

```
SYB_BOOLEAN
hcb_delete(SDES *sdes, INDEX *indptr, BYTE *rowptr, int rowlen,
        SYB_BOOLEAN is_from_readsdes, ptnid_t ptnid)
{
        if (hash table is not initialized)
        {
                stop and return
        } calculate hash value using index key columns in data row call hcb_find() to find the matching hash node if (matching hash node is found)
        {
                if (CAS(mark a DELETE flag in next pointer of this hash node) == FAIL)
                {
                        stop and return
                } if (matching node is the first node in the hash chain)
                {
                        if (CAS(bucket_addr, addr_cur_node, addr_next_node_of_cur_node) == FAIL)
                        {
                                find a new prev node
                                retry changing its' next pointer
                        } put the detached node into GC queue
                        stop and return
                }
                else
                {
                        if (CAS(next_node_ptr_of_prev_node, addr_cur_node, addr_next_node_of_cur_node)
                                == FAIL)
                        {
                                find a new prev node
                                retry changing its' next pointer
                        } put the detached node into GC queue
                        stop and return
                }
        }
}
```

FIG. 16

LOCK-FREE HASH INDEXING

CROSS REFERENCE TO RELATED APPLICATIONS

This application claims priority to Indian Provisional Application No. 201741007221, filed Mar. 1, 2017, and U.S. Provisional Patent Application No. 62/521,513, filed Jun. 18, 2017 and entitled "IN-MEMORY ROW STORAGE ARCHITECTURE", the disclosures of which are entirely incorporated herein by reference in their entirety. This application is also related to co-pending U.S. patent application Ser. No. 15/859,175, filed Dec. 29, 2017 and entitled "IN-MEMORY ROW STORAGE ARCHITECTURE", co-pending U.S. patent application Ser. No. 15/859,181, filed Dec. 29, 2017 and entitled "IN-MEMORY ROW STORAGE DURABILITY", co-pending U.S. patent application Ser. No. 15/908,724, filed Feb. 28, 2018 and entitled "GARBAGE COLLECTION FOR IN-MEMORY ROW STORAGE", co-pending U.S. patent application Ser. No. 15/908,725, filed Feb. 28, 2018 and entitled "INFORMATION LIFE CYCLE MANAGEMENT OF IN-MEMORY ROW STORAGE", the disclosures of which are entirely incorporated herein by reference in their entirety.

FIELD

The subject matter disclosed herein relates to methods and apparatus for, among other things, lock-free hash indexing for in-memory row storage architectures.

BACKGROUND

Online Transaction Processing (OLTP) Performance has been a key differentiating feature over the years for database management systems. In recent systems, the focus has been on providing "extreme" OLTP (xOLTP) performance, "extreme" scalability on multiple engine configurations, and so on. The demand for this level of performance is on the rise, going from sub-second, to sub-millisecond, and now microsecond performance. Recent advances in hardware technology, like fast multi-core processors supporting large amounts of memory (often in excess of 1 TB per box), have raised the bar on performance. Providing xOLTP performance on commodity hardware, equipped with multi-core computing architectures, at low total cost of ownership (TCO) has been important to database management system offerings in recent years.

Continuing this advancement in xOLTP capability, database management systems may be enhanced in new directions to leverage the high-end power available on modern multi-core platforms supporting large amounts of memory. Therefore, it may be desirable to provide systems and/or methods for faster database access/processing.

SUMMARY

In some aspects, a method, computer program product, and system are provided. The method, computer program product, and system execute operations for implementing and/or utilizing in-memory row storage architecture. For example, a system can include (or otherwise utilize) at least one processor and/or memory, which can be configured to perform operations including adding, based on a database operation, a data row to an in-memory row store at a row location, wherein the database operation comprises at least one of an insert of the data row, an update of the data row, or a selection of the data row. The operations can further include indexing the row location in an index table comprising a plurality of nodes for a plurality of rows in the in-memory row store, the plurality of nodes organized across a plurality of buckets. In some aspects, the row location can be indexed based on determining a hash value based on a key for the data row, determining a bucket location from among the plurality of buckets based on the hash value, and/or adding a node within the index table for the data row within the bucket location. The operations can further include accessing, based on the index table, the data row at the row location in the in-memory row store to perform another database operation on the data row.

In some aspects, the node comprises one or more of a pointer to a next node in list of active nodes within the bucket location, a pointer to a next node in a list of nodes marked for deletion within the bucket list, an indication of an identifier for the data row, an indication of a most recent time at which the node was updated, and an indication of the hash value. In some variations, accessing the data row to perform the another database operation comprises determining a second hash value based on the key for the data row, searching, based on the second hash vale, for the node, and/or accessing, based on the indication of the identifier for the data row, the data row at the row location within the in-memory row store.

In some variations, the operations can further include searching, based on the database operation, the plurality of nodes for a second node corresponding to the data row, and/or searching, in response to determining that there is no second node corresponding to the data row, a second index table for the data row, the second index table comprising a plurality of indices for a second plurality of rows stored in a persistent page store, wherein the adding the data row to the in-memory row store at the row location is in response to locating the data row within the second index table. In some aspects, the index table can be stored in the in-memory row store, wherein the second index table is stored in the persistent page store.

In some variations, the bucket location comprises a linked list of nodes organized in order of row identifiers and/or adding the node within the index table comprises adding the node to the linked list of nodes based on modifying at least one node in the linked list of nodes to include a pointer to the node, and/or including a pointer within the node to at least one node in the linked list of nodes.

In some variations, the operations can further include marking, in response to determining that the data row is not transactionally active or that the second operation comprises a delete of the data row, the node for deletion, wherein marking the node for deletion comprises placing the node into a linked list of nodes to be deleted, and/or deleting, based on a background thread traversing the linked list, the node from the in-memory row store.

In some variations, the operations can further include determining, at a start of execution of the another database operation, a first value of information stored within the row location, generating, based on the another database operation and the first value, replacement information, comparing, at an end of execution of the another database operation, the first value to a second value of information stored within the row location, and/or updating, based on the first value being equal to the second value, the row location to include the replacement information.

In some variations, the operations can further include performing, based on determining that an error affecting a database transaction comprising the database operation has occurred, a rollback of the database transaction, wherein the rollback comprises removing the data row from the in-memory row store and deleting the node from the index table. In some variations, the operations can further include determining whether a count of the plurality of buckets exceeds a threshold value, and/or allocating, when the count exceeds the threshold value, first memory for a first layer of buckets and second memory for a second layer of buckets, wherein each bucket within the second layer of buckets includes at least one pointer to at least one bucket in the first layer of buckets, and wherein the second memory is configured for storage of the plurality of nodes.

Implementations of the current subject matter can include, but are not limited to, systems and methods consistent with the present description, including one or more features as described, as well as articles that comprise a tangibly embodied machine-readable medium operable to cause one or more machines (e.g., computers and/or the like) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, and/or the like.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

BRIEF DESCRIPTION OF THE DRAWINGS

FIG. 7 illustrates an algorithm for VRID generation, in accordance with some implementations;

FIG. 14 illustrates pseudo-code of a hash table searching function, in accordance with various implementations;

FIG. 15 illustrates pseudo-code for inserting a hash node, in accordance with various implementations;

FIG. 16 illustrates pseudo-code for deleting a hash node, in accordance with various implementations;

Where practical, like labels are used to refer to the same or similar items in the figures.

DETAILED DESCRIPTION

As noted above, database management systems may be enhanced to leverage the high-end power available on modern multi-core platforms supporting large amounts of memory. At least some of the subject matter described herein relates to systems and methods for providing an in-memory row storage architecture.

Figure 1:
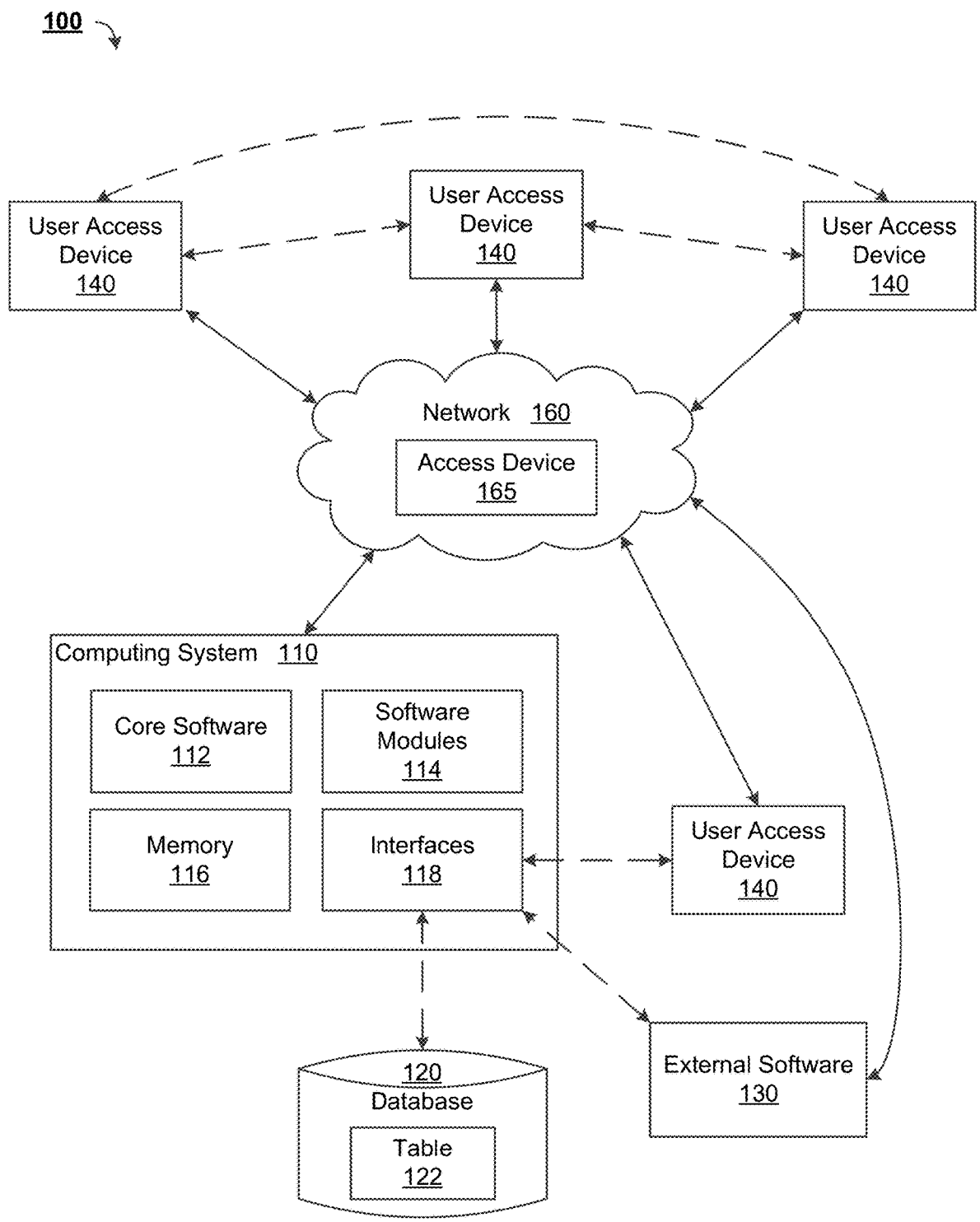
FIG. 1 illustrates a functional block diagram of a system in which features consistent with the described subject matter may be implemented.

FIG. 1 illustrates a functional block diagram of a system 100 in which features consistent with the described subject matter may be implemented. As illustrated, the system 100 can include a computing system 110 capable of communicating with one or more user access devices 140. In some aspects, the computing system 110 can utilize one or more interfaces 118 for communication. Communication among the devices of the system 100 can be through the use of direct communications, such as through the use of a wireless connection like Bluetooth, near-field communication (NFC), ZigBee, and/or the like, and/or a hard wire connection such as universal serial bus (USB). Communication can additionally or alternatively occur through indirect communications, such as over a network 160 (e.g., a local area network, a wide area network, a wireless network, the Internet, or the like).

Communication over the network 160 can utilize a network access device 165, such as a base station, a Node B, an evolved Node B (eNB), an access nodes (ANs), a hotspot, and/or the like. In some aspects, any of the user access device 140 can include personal computers, desktop computers, laptops, workstations, cell phones, digital media devices, smart phones, smart watches, PDAs (personal digital assistants), tablets, hardware/software servers, sensors, sensor devices, terminals, access terminals (ATs), mobile stations, user equipment (UE), subscriber units, and/or the like. Wired or wireless communication among the computing system 110 and user access devices 140 can occur according to various protocols and/or access technologies (e.g., Global System for Mobile Communication (GSM), Universal Mobile Telecommunications System (UMTS), technologies developed by IEEE such as Wi-Fi and/or Bluetooth, technologies developed by the Third Generation Partnership Project (3GPP) or 3GPP2 such as Long Term Evolution (LTE) and/or CDMA2000, and/or the like.).

As illustrated, the computing system 110 can include core software 112 and/or one or more software modules 114. The core software 112 can provide one or more features of a high-level programming software system. The software modules 114 can provide more specialized functionality. For example, the core software 112 and/or software modules 114 can include database management features, such as those described herein. In some aspects, the core software 112 or other similar software/hardware can be capable of accessing a database layer, such as the database 120, which includes at least one table 122, which can in turn include at least one column. The database table 122 can store any kind of data, potentially including but not limited to definitions of business scenarios, business processes, and one or more business configurations as well as transactional data, metadata, master data, and/or the like. relating to instances or definitions of the business scenarios, business processes, and one or more business configurations, and/or concrete instances of data objects and/or business objects that are relevant to a specific instance of a business scenario, business process, and/or the like.

In some aspects, one or more of the software modules 114 can be configured to utilize data stored in the memory 116, data stored in the database 120, and/or data otherwise accessible to the computing system 110. As further illustrated, the computing system 110 can be capable of utilizing external software 130. In some aspects, the external software 130 can provide additional functionalities or services which may not be available at the computing system 110. In some aspects, the external software 130 may include cloud services. In some aspects, the computing system 110 can aggregate or otherwise provide a gateway via which users can access functionality provided the external software 130. In some implementations, the database 120 and/or the external software 130 can be located across one or more servers, and/or communication among the computing system 110, the database, and/or the external software 130 can occur over the network 160.

At least a portion of the illustrated system 100 may include hardware and/or software that interacts with a database, users, and/or other software applications for defining, creating, and/or updating data, for receiving, handling, optimizing, and/or executing database queries, and/or for running software/applications (e.g., software modules 114, and/or external software 130) which utilize a database. In some aspects, the database 120 can be a structured, organized collection of data, such as schemas, tables, queries, reports, views, and/or the like, which may be processed for information. The database 120 may be physically stored in a hardware server or across a plurality of hardware servers. The database 120 may include a row store database (or a column store database) and/or the computing system 110 may be configured to perform OLTP (online transaction processing) and/or OLAP (online analytical processing), which can include complex analytics and tasks. Any of the data stored in the database 120 can additionally or alternatively be stored in the memory 116, which may be required in order to process the data.

In some aspects, the core software 112 can be configured to load the information from the database 120 to memory 116 (e.g., main memory) in response to some event and/or determination. For example, in some aspects, data may be retrieved from the database 120 and/or loaded into the memory 116 based on receipt of a query instantiated by a user or computer system, which can occur through one or more user access device 140, external software 130, and/or the like. In some implementations, at least a portion of the data for the database 120 can reside in-memory (e.g., in random-access memory (RAM)), within the memory 116, for example. In some aspects, data stored in-memory can be accessed faster than data stored in long term storage (also referred to herein as "on disk").

Although the database 120 can be illustrated as described as being separate from the computing system 110, in various implementations, at least a portion of the database 120 can be located within the memory 116 of the computing system 110. Procedures for handling how, when, and why data can be stored in-memory and/or on disk are described herein. The overall architecture of a system with data spanning both in-memory and on disk can be referred to as a storage architecture.

Figure 2:
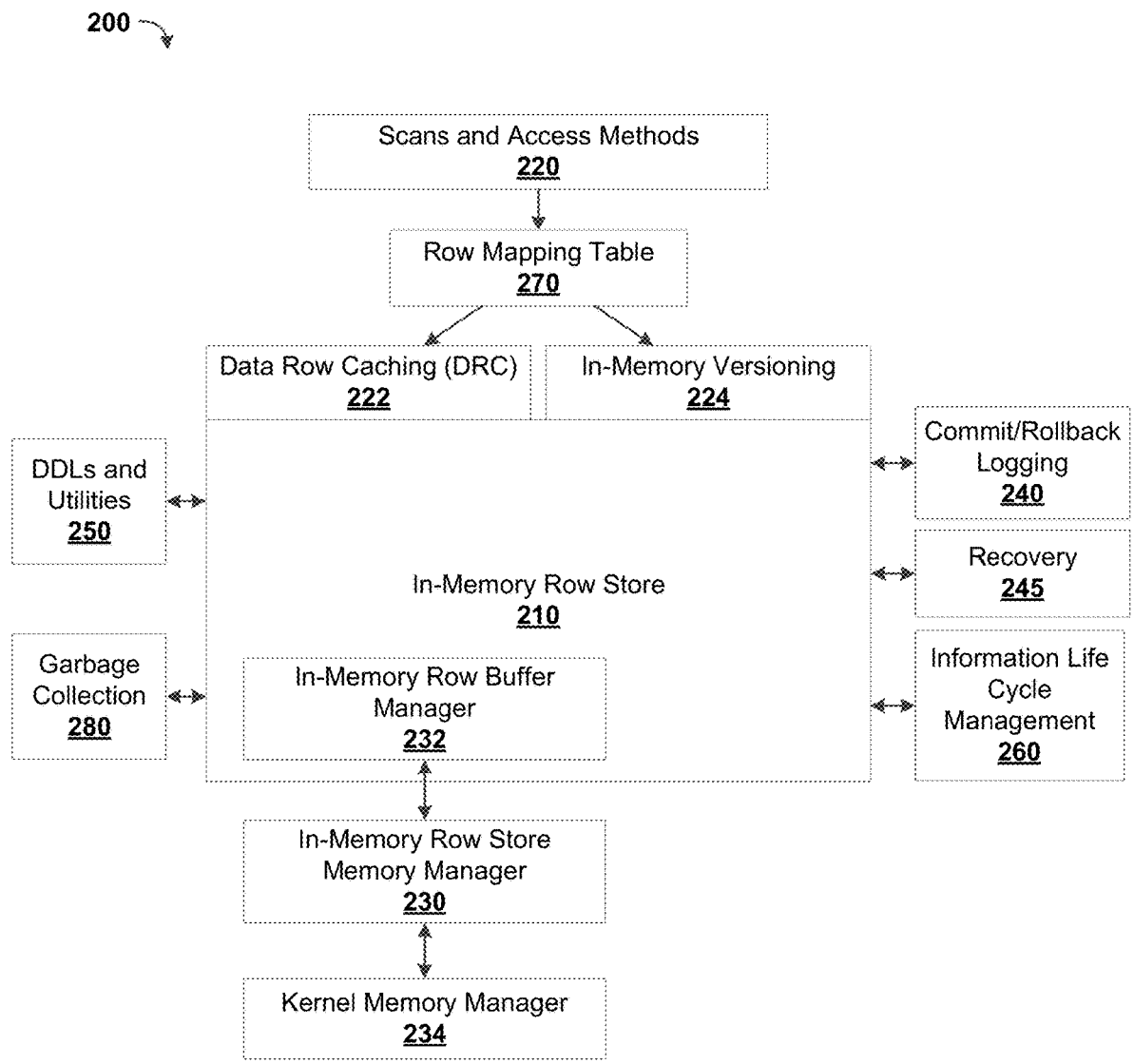
FIG. 2 illustrates components supporting at least a portion of a storage architecture (SA), in accordance with some example implementations.

FIG. 2 illustrates components supporting at least a portion of a storage architecture (SA) 200, in accordance with some example implementations. As illustrated, an in-memory row store (IMRS) 210 can be at the center of the SA 200 and/or many of the components of the SA 200 can communicate with the IMRS 210. As further illustrated, the SA 200 can include scans and access methods 220, a row mapping table 270, data row caching (DRC) 222, in-memory versioning 224, an in-memory row buffer manager 232, an IMRS memory manager 230, a kernel memory manager 234, commit/rollback logging 240, recovery 245, information life cycle management (ILM) 260, data description language (DDL) structures and utilities 250, and/or garbage collection 280. One or more of the components of the SA 200 can be implemented via software and/or hardware, such as through physical storage device(s), processor circuit(s), and/or programming language instructions. In some aspects, the SA 200 can be regarded as a level-2 overall architecture. In some aspects, the SA 200 can be configured for delivering OLTP/xOLTP performance.

Important functionalities supported by the SA 200 can include (1) an in-memory row store and/or access layers (e.g., Data Row Caching) tightly integrated with other database management system components; (2) a singular product offering enhancements (e.g., to minimize the adoption hurdles when existing Enterprise resource planning (ERP) and/or Financial Services industry (FSI) customers evaluate new database management system offerings to upgrade to from their current installations); (3) simple upgrade paths for existing installations and/or users; (4) technologies to enhance OLTP performance without destabilizing existing sub-systems, which can continue to execute for legacy (e.g., non-xOLTP) applications; (5) continued support for relevant and/or frequently used existing features of database management systems in conjunction with the IMRS; and/or (6) incremental rollout of additional xOLTP performance enhancements to various database management sub-systems.

Definitions can be provided for functionality supported by the SA 200, which can aid in delivering xOLTP performance on data-rows-locked tables in an symmetric multiprocessing (SMP) installation, for example. Tight integration of new technologies and/or functionalities with existing database management system capabilities can provide an important differentiating feature. Along with enhanced performance, application compatibility with current features, ease of migration to a new architecture, and/or seamless transition at run-time to the new capabilities are some potential advantages of the SA 200. These advantages can provide high performance for large classes of business suite (BS) applications in a variety of industry verticals utilizing database management systems as the underlying database engine, and/or for transactional workloads in markets in which certain database management systems are dominant.

References to the SA 200 herein can refer to the entire architecture or some portion thereof. For example, functionality described with respect to the SA 200 can be implemented using one more of the illustrated components of the SA 200, one or more components which are not explicitly illustrated, some combination thereof, and/or the like.

In some implementations, transactionally active data can be memory-resident (e.g., stored in-memory) and/or a database engine can provide enhanced performance for electronic transactions operating on the transactionally active data. In some aspects, transactionally active data can include data which is accessed a certain number of times, accessed according to a certain frequency, of a certain type, for critical transactions, and/or the like, and may also be referred to herein as "hot" data. The IMRS 210 can provide a row-oriented caching layer, outside of long term storage/persistence, to host hot data and/or deliver enhanced performance for transactions operating on such hosted data.

Figure 3:
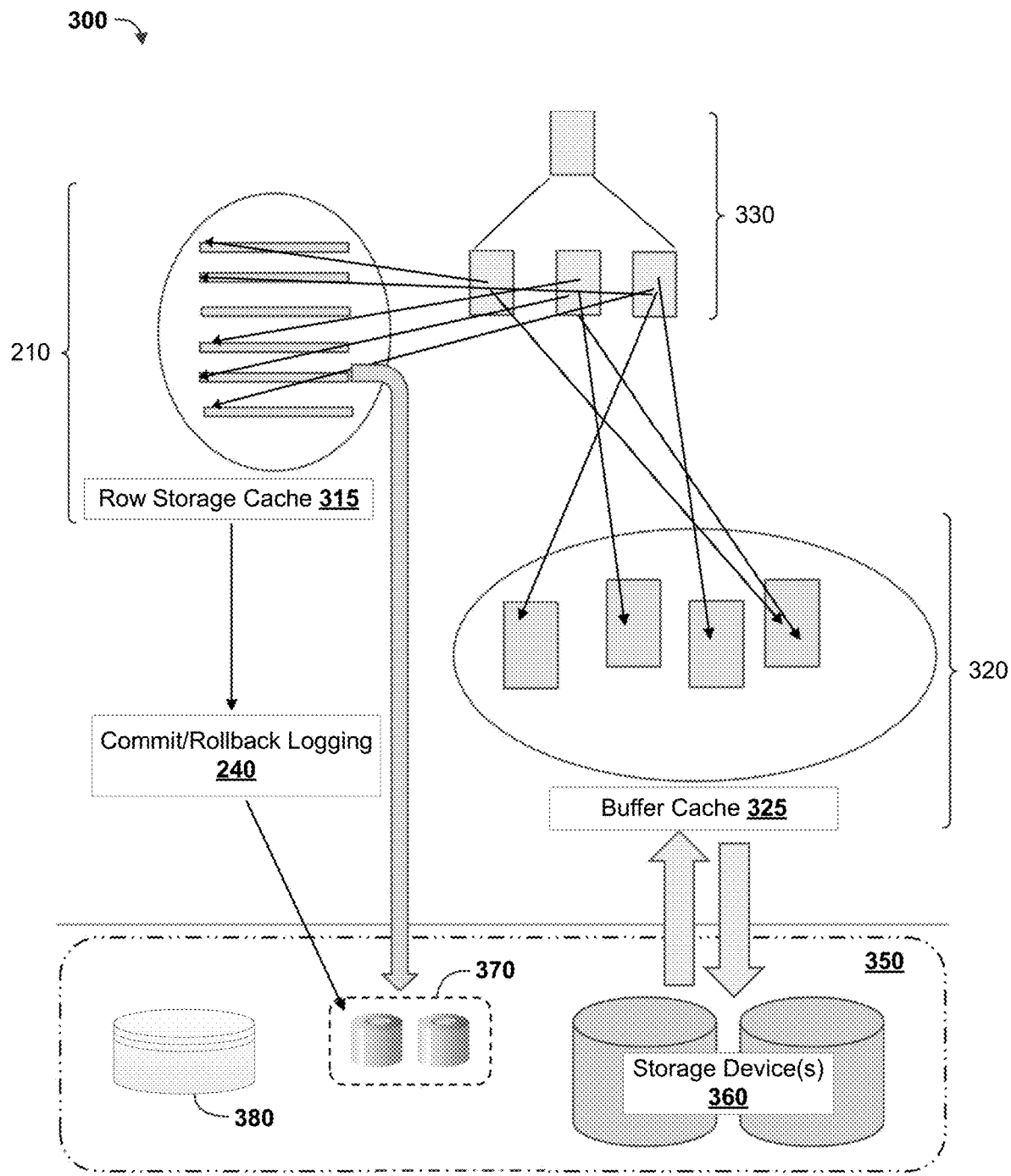
FIG. 3 illustrates a system including components supporting an IMRS, in accordance with some example implementations.

FIG. 3 illustrates a system 300 including components supporting an IMRS 210, in accordance with some example implementations. In some aspects, the system 300 can be similar to the SA 200 of FIG. 2. As illustrated, the system 300 can include the IMRS 210, a row storage cache 315, a page-based storage 320, a buffer cache 325, an index 330, and additional memory 350.

The page-based storage 320 can include page-based, disk-resident storage for data (e.g., data rows and/or index rows), which may be loaded in and/or out of one or more buffer caches 325. However, in some aspects, the page-based storage 320 can include other information and/or be stored according to another format. The index 330 can include a B-tree index and/or multiple levels. The additional memory 350 can include one or more storage device 360 (e.g., hard disk), an IMRS log 370, and/or a system log 380. Commit/rollback logging 240 can leverage the IMRS log 370 in the event the system 300 (or some component thereof) crashes, is turned off, is reset, and/or the like.

As illustrated, the index 330 can span the IMRS 210 and the page-based storage 320. When data (e.g., a row) is required for operation, the index 330 can locate the data regardless of whether the data is located in the IMRS 210 and/or the page-based storage 320. As further illustrated, the index can include multiple levels.

The rows hosted in the IMRS 210 can be accessed (e.g., using a select operation) and/or modified (e.g., using an UPDATE and/or DELETE operation) at various isolation levels (e.g., level-0, level-1, level-2, level-3, and/or the like). The IMRS 210 can provide a data store layer, providing access to the rows at the desired isolation level and/or at the right interface/coupling needed by a query processing layer. The IMRS 210 can also be referred to as the row storage cache 315 and/or including the row storage cache 315.

In some implementations, a tightly-integrated IMRS 210 can be added to database management systems and/or provide full indexing support for data that is resident in the IMRS 210. The IMRS 210 can provide the backbone for performance-oriented features for database management systems. For example, storage models can be designed to reflect a data life cycle intrinsic to certain kinds of transaction workloads, so that performance commensurate with the data life cycle can be delivered through storing rows in-memory and/or on a disk-based page store. Fully durable, ACID (Atomicity, Consistency, Isolation, Durability) compliance can be provided to the data resident in the IMRS 210. Full archive management can be provided through a backup server supporting operations of a database containing data resident in the IMRS 210.

Figure 4:
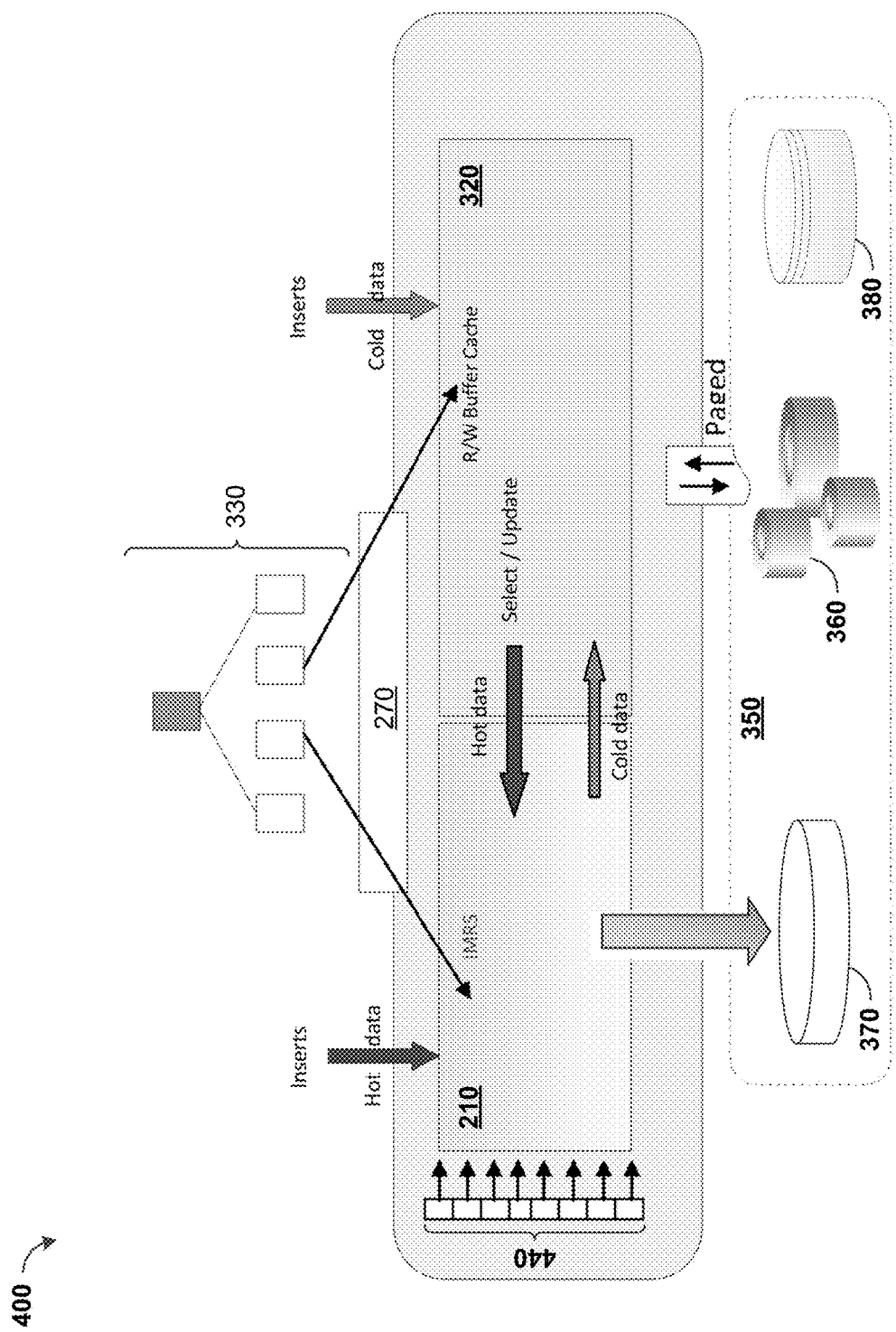
FIG. 4 illustrates another system including components supporting an IMRS, in accordance with some example implementations.

FIG. 4 illustrates another system 400 including components supporting an IMRS 210, in accordance with some example implementations. In some aspects, the system 400 can be similar to the system 300 of FIG. 3.

In some aspects, the IMRS 210 can be configured to host different types of rows, such as inserted rows, migrated rows, cached rows, other row types, and/or the like. Inserted rows can be rows that are newly inserted to an IMRS-enabled table, which can go directly to the IMRS 210 without a page-resident image of the row in the page-based storage 320. Future updates to such rows can continue in the IMRS 210, but the row may still be referred as an inserted row. Migrated rows can include rows that reside in the page-based storage 320 but are subsequently migrated to the IMRS 210. If rows are migrated, for updates or deletes or the migrated rows the contents of the row in the IMRS 210 can be the latest version and/or the version of the row in the page-based storage 320 may be stale. Cached rows can refer to rows that reside in the page-based storage 320 but are frequently accessed, and hence can be cached within the IMRS 210 (e.g., without changes to their contents). The contents of the cached rows in the IMRS 210 and their original image in the page-based storage 320 can be identical.

The IMRS 210 may be configured to host all rows of a new or existing table entirely in-memory. This can lead to an in-memory "hot" table. Similarly, if individual partitions are enabled to use the IMRS 210 and/or sufficient memory is provided by the system 400 for the IMRS 210, then all rows of a partition may be memory-resident. This can lead to a "hot" partition storage model. For truly hot tables and/or partitions, with appropriate memory configuration hooks and/or DDL support the portion of the table and/or partition in the page-based storage 320 may be empty. This can lead to potential access optimizations. For VLDB (Very Large Database) tables, the IMRS 210 may hold only some of the most active rows from a table and/or partition. The rest of the less active rows can continue to be stored in the page-based storage 320 and/or be accessed by page-based and/or buffer cache methods. This usage of the IMRS 210 can be referred to as a "hot data" model, where the tables' and/or partitions' data can be partially in the IMRS 210 and partially in the page-based storage 320. In some aspects, a table can be regarded as an organizational database structure having multiple database partitions. In some aspects, a database partition can be regarded as an organizational database structure having multiple rows comprising data.

Some database management system architectures can follow a page-based disk-resident storage model with a buffer cache providing the in-memory storage for page-based data. However, this model can suffer from some performance issues, such as latching overheads for data and/or index pages, locking overheads, length of code-path issues, run-time logging overheads, others issues in the area of concurrency and/or blocking between concurrent readers and/or updaters of data, and/or the like. The IMRS 210, on the other hand, can provide for delivery of enhanced performance for transactions operating on hot data, of storage models that intrinsically reflect the information life cycle of transactional data, and/or the like.

The IMRS 210 can be defined to support "hot tables" and/or "hot data." Hot tables can include a database table that is entirely memory-resident, being frequently scanned, and/or being frequently updated. Hot data can include portions of a database table that are transactionally active, where remaining data from the database table is memory-resident. In some implementations, transactional data can be regarded as "hot" (e.g., frequently accessed and/or modified), "warm" (e.g., occasionally accessed and/or updated), and/or "cold" (e.g., infrequently accessed and/or rarely updated). In some aspects, transactional data can be broadly classified as active or passive data. Defining an architecture that can provide enhanced performance for transactions operating on hot data can be desirable. Similarly, providing storage and/or access models that reflect the usage pattern of data based on their access patterns can be beneficial.

Providing an expected usage model for transactional data can involve creating and/or inserting a data record(s) into a database and accessing and/or modifying the data record(s) for some period of time/activity following the creation and/or insertion. Once a transaction "completes" (e.g., once data records are updated), previously active data rows tend to be less frequently accessed and/or updated, thereby becoming passive data. Occasionally (e.g., periodically), passive data may be re-activated by regularly occurring events (e.g., end of quarter accounting, end of year accounting, targeted sales promotions, and/or the like), at which time data may become active again. However, over time, passive data often becomes inactive, at which time a less-efficient storage and/or access mechanism can be preferred for such data.

In some aspects, insert, select, update, and/or delete operations (ISUDs) on transactionally hot data can be driven by fully-qualified index access. In some aspects, tables can be required to have at least one index, which might not be required to be unique. However, tables in the schema of an OLTP system can be expected to have a primary key index and/or one or more unique indices. Secondary indices can also be defined on such tables. Access of an entire table (e.g., table scans) can be expected to either not occur or rarely occur in a workload. Updates can typically change non-index key columns, and/or the index key columns of primary or unique indices may rarely, if ever, be updated. Operational activities such as building indices and/or defragmenting tables may not occur on active data and/or can be scheduled to occur during off-hours of activity.

In-Memory Row Store 210

The IMRS 210 can provide a high-performance, in-memory row store for active data. Data that is transactionally active can reside in the IMRS 210, which can be enabled as a per-partition storage repository for hot data (e.g., hot tables or hot partitions) and/or can be an extension of the page-based storage 320. The IMRS 210 can be both a store and a cache in that it can provide a memory-based storage repository for active data rows which are frequently updated. The IMRS 210 can also provide a repository for caching active rows that are frequently selected, which can act as an efficient cache for hot rows between a buffer cache 325 and user queries. Additionally or alternatively, a query-processing-friendly row format (QPFRF) can be created for frequently selected rows to act as another "row-caching" layer on top of the IMRS 210 data row to accelerate performance (e.g., when performing a select operation).

A QPFRF can include an internal layout of frequently selected rows in the IMRS 210, oriented in a manner such that the column values can be accessed directly from values in the IMRS 210 rows and/or without requiring further alignment or data copying to query processing structures. This format of the IMRS 210 data row can be generated based upon access criteria such as frequency of access. A QPFRF row can be manufactured for frequently scanned rows from the IMRS 210 that are mostly only read (e.g., as opposed to mostly written).

Figure 5:
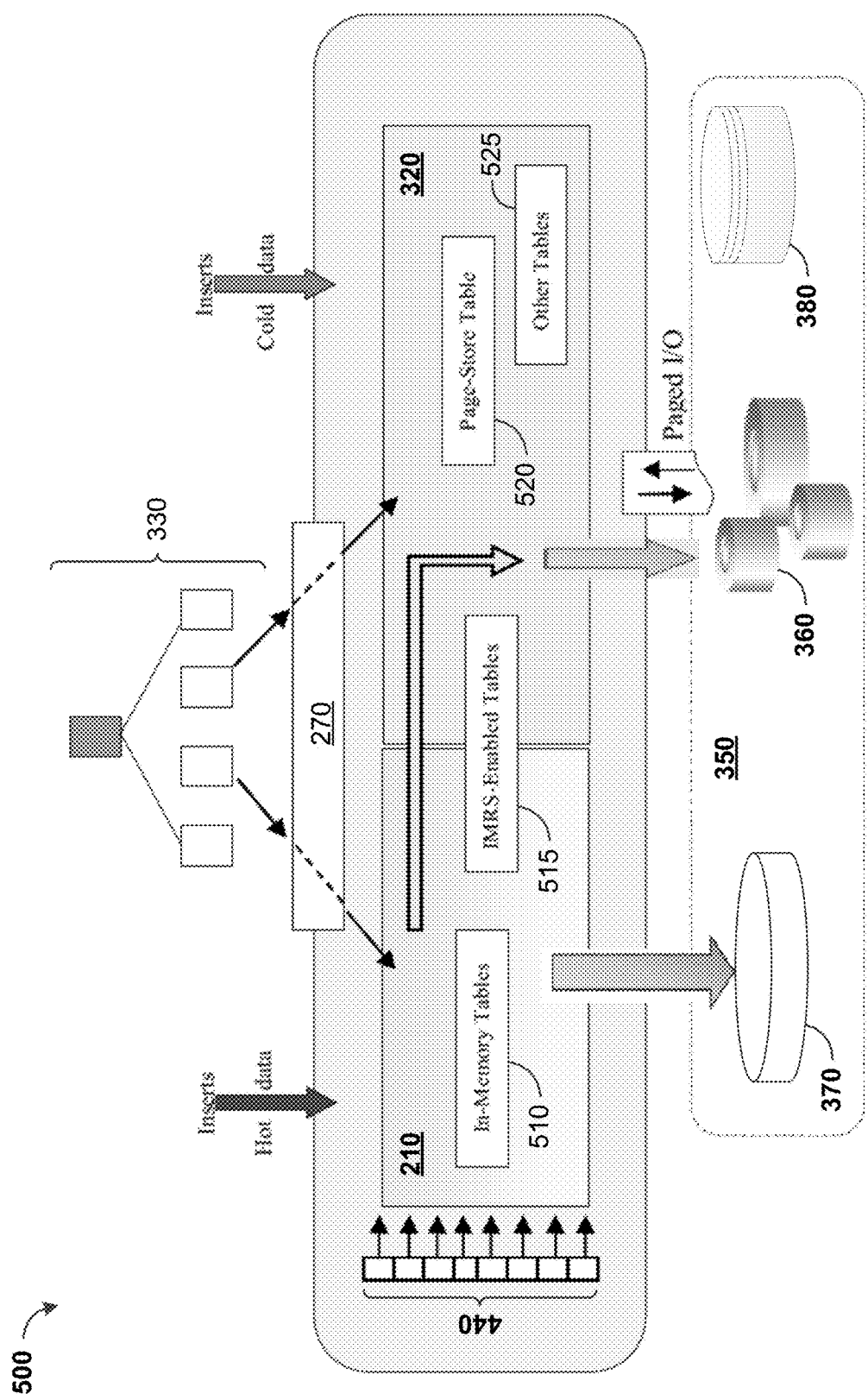
FIG. 5 illustrates another system including components supporting an IMRS, in accordance with some example implementations.

FIG. 5 illustrates another system 500 including components supporting an IMRS 210, in accordance with some example implementations. In some aspects, the system 500 can be similar to the system 400 of FIG. 4.

In some aspects, not all tables are expected to be memory-resident. For example in some implementations, only a small number of hot tables in an OLTP schema may be expected to completely leverage the IMRS 210 model, which may be referred to as in-memory tables 510. Tables that are defined or altered to use the IMRS 210 can be referred to herein as IMRS-enabled tables 515. In some aspects, IMRS-enabled tables 515 can be configured for use within both of the IMRS 210 and the page-based storage 320. DDLs and utilities 250 (e.g., DDL functions and/or extensions) can be provided to define new tables as being IMRS-enabled and/or to alter existing tables to leverage the IMRS 210. Tables which reside fully on the page-based storage 320 can be referred to as page store tables 520. Other tables 525 may also exist.

Data residing in the page-based storage 320 can be read into a buffer cache 325, which can provide the input and output (I/O) channel for reading and/or writing pages from and/or to disk (e.g., within a storage device 360). The IMRS 210 can provide an in-memory storage layer where frequently accessed data rows can exist in an uncompressed format and/or in a layout that can provide for efficient access and/or manipulation by a query processing execution engine.

In some implementations, new data may be initially inserted into only the IMRS 210 (e.g., in-memory), remain in the IMRS 210, and/or be accessed and/or updated directly in the IMRS 210. In some aspects, a table including such newly inserted data can include a union of rows found (if at all) in the page-based storage 320 (some of which may have been buffered in the buffer cache 325) and rows in the IMRS 210.

Database tables can have a primary key index and/or some other unique index. The rows for a given table in the IMRS 210 can be stored in per-partition based structures so that partition-specific scanning can be supported when needed. In some aspects, different forms of indices, unique and non-unique indices, local and global indices, and/or the like can be allowed on multi-column composite keys.

The IMRS 210 can provide a repository for older versions of rows that are updated, such as when versioned rows are chained in reverse chronological order of the update sequence. Rows that exist on the page-based storage 320 when they are updated can result in a new row being inserted into the IMRS 210, with the page-based row becoming the prior version for the updated row in the IMRS 210.

A disk-resident fully durable database (DRDB) enabled for IMRS 210 usage can include a database supporting all of the ACID properties and/or providing full support for load database operation and/or load transaction operation functionality. A DRDB enabled for IMRS 210 can differ from other in-memory database offerings where the entire database is fully in-memory, as an IMRS-enabled database may only require and/or utilize a portion of the database in-memory. For a VLDB installation, due to constraints on available memory and costs thereof, an IMRS-enabled database can be more practical (e.g., than a fully memory-resident database) to achieve the required OLTP performance. An IMRS-enabled database can include a disk-resident database enabled for IMRS 210 usage by provisioning a row storage cache.

Row Storage Caches 315

To support IMRS 210 functionality, database management systems can be enhanced to support row-oriented caching, referred to herein as a row storage cache 315. In some aspects, the row storage cache 315 can be similar to a page-based buffer cache 325. Memory can be allocated to a cache of a new row storage type and/or memory can be allocated for row-buffers. In some implementations, management of row storage caches 315 can be through cache configuration interfaces, wherein the cache memory can be divided, allocated, and/or freed (e.g., in terms of data row sizes and/or plus any overhead). As the same row storage cache 315 can be shared for data rows from multiple tables with widely varying schemas, allocation and/or freeing patterns can be non-deterministic at run-time. Some base requirements of the row storage cache 315 can be determined and/or inferred based on the schema of tables bound to the row storage cache 315. However, in some implementations, due to presence of variable-length columns and/or in-row large object (LOB) columns (which can be memory-resident), expanding updates, shrinking updates, rollbacks, and/or in-memory versioning for updates, the footprint of memory allocation and/or freeing at run-time can vary depending on the workload and/or data row access patterns.

High-performance row storage caches 315 can be supported by enhancements to the Kernel memory manager 234, providing low-latency, non-blocking, and/or minimal blocking concurrent access to cache memory. An intermediate layer, such as the IMRS memory manager 230, can collaborate (e.g., communicate and/or interface) with the kernel memory manager 234 providing memory management services at the kernel level (keeping the schema and row-usage patterns in perspective) to provide information to the in-memory row-buffer manager 232, which can be optimal/efficient (e.g., in terms of memory usage and/or fragmentation).

Data Row Caching 222

DRC 222 can be a feature built on top of the IMRS 210 to deliver improved performance while scanning and/or updating frequently accessed rows from data-rows-locked tables. Individual tables in a database setup for IMRS 210 usage can be selectively enabled to use DRC 222. DRC 222 can leverage access patterns to data rows and/or attempts to access (e.g., via selects and/or data manipulation language (DML) operations, such as retrieve, store, modify, delete, insert, update, and/or the like) rows directly in the IMRS 210, rather than in the page-based storage 320. Enabling DRC 222 for hot tables can deliver improved performance, especially for high-volume OLTP workloads.

DRC 222 can leverage the capabilities of the IMRS 210 to host data from frequently accessed/modified rows ("hot" rows) in the IMRS 210. Newly inserted rows to an IMRS-enabled table can be inserted first and/or only into the IMRS 210. Subsequent access to those rows for selects or modifications can be provided directly from the IMRS 210. This can be one form of DRC 222 usage of the IMRS 210. Another form of DRC 222 usage can be when existing rows in the page-based storage 320 are updated and/or scanned repeatedly. Another form of DRC 222 usage can be when all/most of the rows in a table are frequently updated (e.g., the available inventory in a warehouse consisting of a reasonably small product list). Such rows/tables can be migrated from the page-based storage 320, hosted in the IMRS 210, and/or subsequent access/modifications to those rows can continue in the IMRS 210.

In some aspects, when DRC 222 is enabled for a table, new inserts can be first inserted to the IMRS 210 without allocating any space in the page-based storage 320. Subsequent updates to such rows can be performed in the IMRS 210. If such rows are then subsequently deleted, the row can be deleted directly from the IMRS 210 without requiring access to the page-based storage 320.

Frequent updates to rows residing in the page-based storage 320 may result in the row being migrated to the IMRS 210. Subsequent updates may then performed to the in-memory version of the row, which can be in an uncompressed format. In some implementations, no data page or buffer access results while updating the row in the IMRS 210. Depending on the access pattern to hot data, some frequently accessed rows may be cached in the IMRS 210 in an uncompressed format. Subsequently, scans to such rows may be performed directly from the IMRS 210, without accessing the data page or data buffers.

Rows residing in the IMRS 210, whether for newly inserted rows or migrated rows, can be accessible via the index 330. Over time, when access to rows in the IMRS 210 decreases, a background task can harvest old and/or cold data rows, move them back to the page-based storage 320, and/or release memory used by such rows back to the IMRS 210. Rows that were newly inserted to the IMRS 210 can be moved to newly allocated pages, whereas existing rows that were migrated to the IMRS 210 from the page-based storage 320 can be migrated back to their original location (e.g., a specific row) on the page-based storage 320.

DRC 222, as a user-visible feature, can be designed to model the storage and access techniques around the data life cycle. Hot data can be preferentially migrated to the IMRS 210, operated in-memory, and/or as data ages-out, transparently moved back to the page-based storage 320 and/or buffer cache 325.

Row Identity (RID) Mapping Table 270

Figure 6:
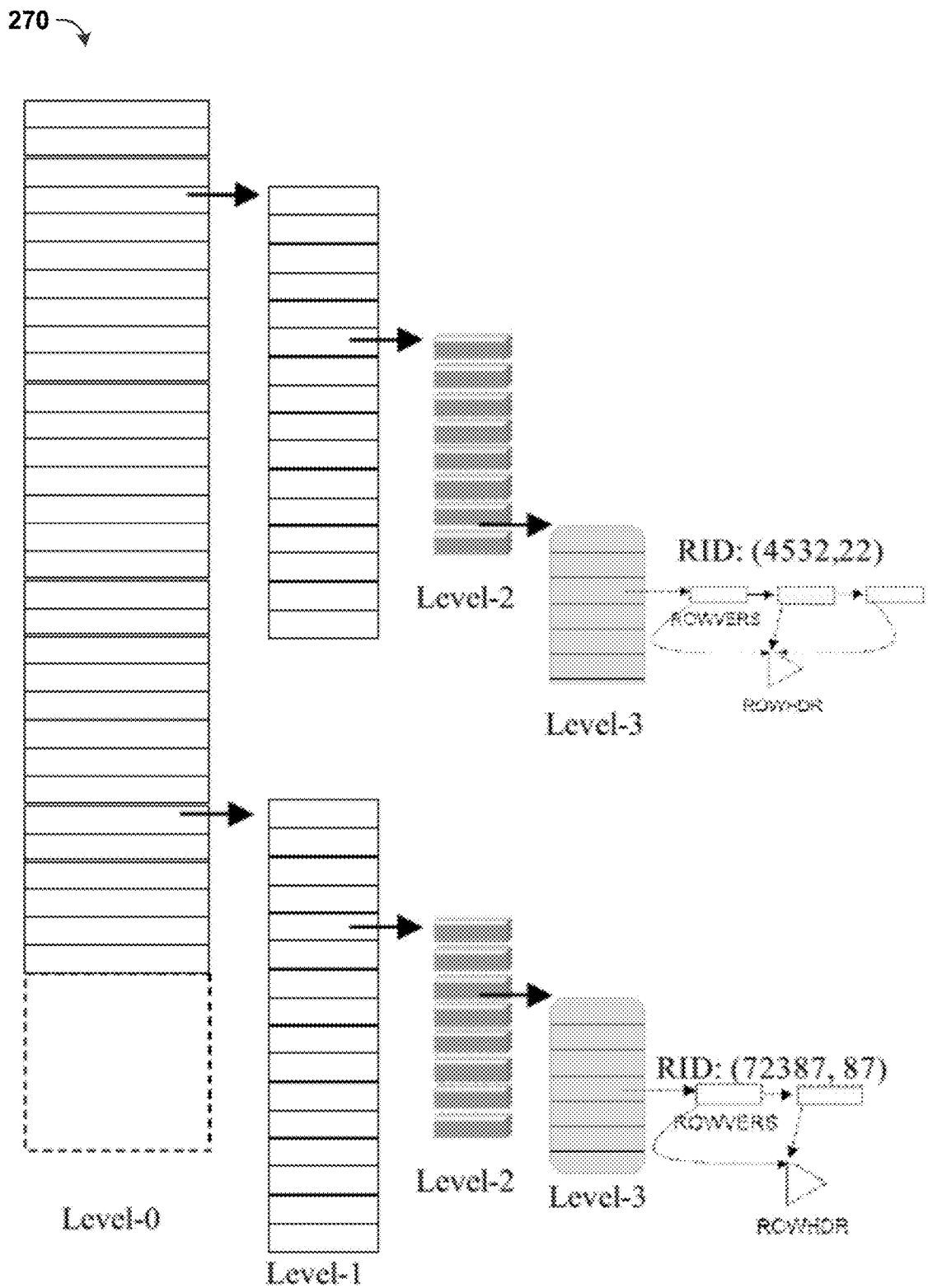
FIG. 6 illustrates a possible layout of the RID mapping table, in accordance with some implementations.

The RID mapping table 270 can include a table that supports index and/or table scans within the SA 200. FIG. 6 illustrates a possible layout of the RID mapping table 270, in accordance with some implementations. The RID mapping table 270 can include a database-wide mapping table having multi-level series of contiguous arrays, mapping a RID (page-ID, row#) to a memory address. Each level of the RID mapping table 270 can map to contiguous chunks of pages in a database's space map. As the IMRS 210 can be designed to hold hot/active rows, only a percentage of existing rows from the page-based storage 320 may be in the RID mapping table 270. In some aspects, the RID mapping table 270 can blossom out to allocate and/or fill out sub-arrays at each level, holding pointers to sub-arrays at the next level (e.g., sub-arrays at level-1 can include pointers to sub-arrays at level-2). Over time, as rows are removed from the IMRS 210, the RID mapping table 270 can shrink to maintain sparseness. For rows that are not in-memory, a probe may return early due to the sparse nature of the sub-levels. The RID mapping table 270 can be managed using efficient, lockless lookups and/or CAS-based updates to grow and/or shrink the memory at different levels.

In some aspects, cached rows stored within the IMRS 210 can initially include read-only rows, but may eventually be updated in-memory. In various implementations, only the in-memory version of the cached row may be updated, whereas the page-based storage 320 image may remain stale. Scan and access methods 220 can be configured to utilize this dichotomy and/or return the latest image of the cached-updated-row from the IMRS 210, using a lookup of the RID mapping table 270.

Row Storage Caches 315

In some aspects, there can be an inherent dependency on the use of DRC 222, as individual features may depend on the existence of a row storage cache 315 being available. In some implementations, only one database-wide row storage cache 315 may be provided, but a per-table row storage cache 315 can additionally or alternatively be provided. In some aspects, a DRC-enabled table can inherit the database's row storage cache 315.

Table 1 shows the behavior of ISUDs for DRC-enabled tables, in accordance with some implementations. In some aspects, for the deletion of rows migrated to the IMRS 210, the page-based storage 320 version of the row can be deleted (and space reclaimed) as a result of a purge operation. In some aspects, the purge operation can be performed (at least in part) via garbage collection 280, as described herein.

TABLE 1

| Operation | Feature |
|---|---|
| Insert | Goes to the IMRS 210 first. Subsequent updates or deletes to rows existing in the IMRS 210 are performed directly in the IMRS 210 without affecting the page-based storage 320. |
| Select | Hot rows that are frequently scanned may be brought to IMRS 210 for row caching (performance benefits). Subsequent selects of these rows return the values directly from the IMRS 210. |
| Update | Occasional updates to some rows that reside on the page-based storage 320 are performed directly on the page-based storage 320. Frequently updated rows may be brought to the IMRS 210, for performance gains for future accesses (e.g., selects and/or updates). Thereafter, updates to such rows are performed in the IMRS 210, without affecting the data page itself. |
| Delete | Performed on the page-based storage 320 when the row is first deleted directly from the page-based storage 320. For delete of a frequently scanned or updated row that was migrated to the IMRS 210, the delete is performed in the IMRS 210 and also from the data page. |

Updates

Updates to rows that are on the page-based storage 320 can continue to be performed on the page-based storage 320. For DRC-enabled tables, run-time heuristics can be applied to identify rows in the page-based storage 320 that are frequently updated and/or relocate the identified rows to the IMRS 210, for improved performance of future selects or updates of such rows. This process can be referred to as row migration. Rows that come into the IMRS 210 due to row migration can be referred to as migrated rows.

In some aspects, as described herein, operations may be logged in the IMRS log 370 for recovery, in the event of system failure, shutdown, restart, and/or the like. Row migration can be a non-logged operation in the IMRS log 370. In anticipation that migrated rows may be re-accessed, rollback of the transaction that caused the row migration can roll back the update itself. However, the migrated row itself may be left in the IMRS 210 as a cached row, in preparation for an immediate access. In other words, the update event itself may be a combination of an unlogged row-caching event, followed by a logged update event. The end result of the row's status in the IMRS 210 can be implementation-defined, subject to available memory and/or other design considerations.

In some aspects, row migration can be performed without updates of indices pointing to the migrated row. The migrated row's RID may not change and/or index scans can be redirected to access the row from the IMRS 210 by looking the migrated row up in the RID-mapping table 270 (e.g., via the scans and access methods 220).

Updates to rows that are in the IMRS 210 (e.g., inserted, cached, and/or migrated rows) can be performed directly in the IMRS 210 without affecting their home-row location (if any) on the page-based storage 320 for migrated and cached rows.

In some aspects, updates of rows in the IMRS 210 can produce new row images for each update, which can consume memory while the transaction is active. Accordingly, the memory for intermediate row versions can be reclaimed, sometime after the transaction completes, via garbage collection 280. A very large transaction performing thousands of updates to the same row could consume memory excessively for intermediate row versions. However, this situation can be mitigated by the availability of garbage collection 280, which can potentially reclaim memory from intermediate versions. The extent to and/or rate at which garbage collection 280 reclaims memory for intermediate versions (e.g., produced by an in-flight transaction) can be determined during implementation and/or at runtime.

In some aspects, the latest version of a row can be in the IMRS 210 and/or the original version in the page-based storage 320 can become stale. Index access to such rows in the IMRS 210 can find the latest version of the row in the IMRS 210. For example, table scans accessing rows from the page-based storage 320 can be configured to return the latest version from the IMRS 210 (e.g., if the row was previously migrated to the IMRS 210).

When the update frequency of a row decreases and/or due to other considerations such as reduced memory available in the IMRS 210, some of the updated rows may be "packed" back to the page-based storage 320 and/or deleted from the IMRS 210, as described herein.

Deletes

Deletes of rows that already reside in the page-based storage 320 can be performed using logged updates on the page-based storage 320. Deletes of inserted rows can be performed as a logged delete in the IMRS log 370. Memory used by the row and/or its intermediate versions can be available for reclamation via garbage collection 280, which can be done after the transaction completes.

Deletes of cached rows can be performed as a logged delete in the page-based storage 320, with logging in the system log 380. The footprint of the cached row in the IMRS 210 can be erased and/or the memory used by the row can be made available for reclamation via garbage collection 280, without resorting to any logging in the IMRS log 370. The system log 380 logging can be performed in-line with the transactional activity using a PLC (Private Log Cache). Memory reclamation can be deferred to after the transaction completes so that run-time transactional performance can be unimpeded (at least in part). If a deleting transaction rolls back, the IMRS 210 version of the row may be safely re-instated without need for further memory allocation or initialization. In some implementations, the cached version of the row can be reinstated following a rollback.

For migrated rows, the IMRS 210 component of the row can be deleted similar to inserted rows. Memory for all versions of the row can be made available to the garbage collection 280 thread for reclamation, which may occur after the transaction completes. In addition, as the migrated row has a counter-part page-resident row-image, the deletion of the row from the page-based storage 320 can be performed as a fully logged operation in the system log 380. In some implementations, logging for the deletion for the page-based storage 320 version of the row can be done in-line with the transactional activity, whereas the logging for the IMRS 210 version can be performed as a commit-time logging operation in the IMRS log 370. In case of a rollback, the page-image version of the row can be restored to its pre-updated image. The final version of the deleted row can be re-instated in the IMRS 210 without an additional memory allocation operation.

Whether the footprint of an IMRS 210 row, such as in the RID-mapping table 270, is erased immediately as part of the commit of a delete or sometime after the transaction completes via garbage collection 280, can be implementation-specific.

Merge

A merge statement can include a two-part statement updating existing rows which qualify and, if not, inserting new rows. It is possible that, for a single merge statement, some rows may be inserted in the IMRS 210 and some other rows may be updated both in the IMRS 210 and the page-based storage 320. If some row-usage threshold(s) are met, some updates under a single merge statement could cause row migration. Logging and/or rollback semantics of the merge statement can be similar to those of the individual insert and/or update components.

Virtual RID (VRID) Generation

In some database systems, each row inserted can have an associated RID (e.g., used to locate a physical memory location for the rows). In some implementations, an RID can include a page identifier and/or row number. For the page-based storage 320, an RID can be generated based on the page in which the row is inserted and/or a row number within that page. However, rows inserted into the IMRS 210 may not have a page-based storage 320 footprint. Thus, an RID may need to be generated for inserted rows. In some aspects, this RID can be referred to as a VRID. A VRID can similarly include a page identifier and/or a row number. However, the page identified by the VRID may be a "virtual" page in the IMRS 210, which can simply include a container for rows and/or might not include metadata, such as metadata associated with page-based storage 320 pages.

To support fast and/or concurrent inserts in-memory, a VRID generation algorithm can use concurrent lockless data structures. For hot partitions with many inserts, a single page per partition could lead to hot spots. Accordingly, the SA 200 can create and/or maintain multiple in-memory pages for inserted rows. In some implementations, each process/connection can select one or more different pages, based on a page identifier. Having the connections select different pages can allow for processing of concurrent inserts, on the same partition by multiple threads, without creating contention for generating VRIDs. If there are a large number of processes/connections, each page of a partition may have a small number of inserted rows. In some implementations, each in-memory page may be designated to store inserted rows from an individual partition. However, there may be no requirement that consecutive pages belong to the same partition(s) (or other object).

FIG. 7 illustrates an algorithm 700 for VRID generation, in accordance with some implementations. The illustrated compare and swap function can be used as a lightweight, lockless synchronization mechanism to generate new page identifiers and/or new row numbers within the same page.

Low or Out-of-Memory in IMRS 210

The SA 200 can be configured to handle low memory and/or out-of-memory conditions (e.g., error states) for IMRS 210 (e.g., for the row storage cache 315) transparently and allow operations (e.g., DML operations) to continue on the page-based storage 320. For example, in some implementations, the SA 200 can prevent new migrations and/or inserts of rows into the IMRS 210 when the IMRS 210 is low and/or out of memory. In order to prevent new migrations and/or inserts, the SA 200 can track a percentage usage of the IMRS 210 and/or the row storage cache 315. For example, if the percentage of utilization increases beyond a threshold (e.g., 70%, 75%, 80%, 85%, 90%, 92.5%, 95%, 100%, and/or the like), then the SA 200 can prevent new rows from being inserted and/or migrated to the IMRS 210, at least until the percentage utilization is decreased to another threshold (e.g., 65%, 70%, 75%, 80%, 85%, 90%, 92.5%, 95%, and/or the like).

In some implementations, the SA 200 can handle low memory and/or out-of-memory conditions while new migrations and/or inserts are processed. For example, if an out-of-memory condition occurs while a new row is being inserted and/or a page-based storage 320 row is being migrated to IMRS 210, the SA 200 can rollback any partial changes made to bring rows in-memory (e.g., any information changed as part of an attempt to insert or migrate a row to the IMRS 210). The insert and/or update can then be transparently redirected to perform the same operation(s) within the page-based storage 320, which can avoid memory errors.

In some implementations, the SA 200 can handle low memory and/or out-of-memory conditions while existing rows are updated. For example, if a row is already present in IMRS 210, then an update and/or delete to this row can be attempted to be processed in IMRS 210 as a first preference, in order to retain hot rows in-memory. If a low memory and/or out-of-memory condition is detected while processing the update and/or delete, then the SA 200 can first pack the committed row to the page-based storage 320, and then redirect the incoming update and/or delete transparently to the page-based storage 320. Packing can ensure that latest committed row is present on page-based storage 320 before update and/or delete modifies the row on page-based storage 320.

Large Object Column Support

A DRC-enabled table's schema can include LOB columns in-row and/or off-row, with the semantics and/or behavior supported for a page-resident table. In some aspects, in-row LOB length criteria and/or limits can apply in relation to a page size of the SA 200. In some aspects, an in-memory row with off-row LOB columns can have the same row format as an on-disk row, such as a format with an embedded text pointer to the first text page (FTP) of an off-row LOB page chain.

Updates to LOB columns for a page-based row, in-row and/or off-row, can operate with little to no modification. However, frequent updates to a row may cause row migration to the IMRS 210, which can be migrated along with a movement of an in-row LOB column to an off-row LOB. Updates to in-row LOB columns for inserted or migrated rows can be done by producing a new in-memory row version with the expanded in-row LOB column. If an update to the in-row LOB columns allow the updated row to be retained in-row, the new row version can store the column value in-memory.

When an update of a LOB column (and/or an expanding update of a variable-length column), causes an in-row LOB value to move off-row, the new row version created can contain a text pointer to the FTP of the off-row LOB page chain. In some aspects, movement of the LOB value from in-row to off-row can be a fully-logged operation in the page-based storage 320, captured in the system log 380. Additionally or alternatively, changes to an in-memory component of a LOB column can be captured in the IMRS log 370 as part of the commit. In some implementations, a shrinking update of an off-row LOB column's value can migrate the value in-row. This shrinking update can result in a logged, page deallocation of of-row LOB page chains in the system log 380, and/or the new in-memory row version can be created with the updated, smaller in-row LOB value.

Frequent updates to a row in the page-based storage 320 may trigger row migration to the IMRS 210. If an in-row LOB column is updated, such that it continues to remain in-row, then the migration process can involve creating and/or caching a new row-version, with the expanded in-row LOB column value, in the IMRS 210. If an in-row LOB column is updated, such that it moves off-row, then the row can be first cached in the IMRS 210 (as part of the migration), and then the off-row LOB column can be allocated as part of migrating the new row version. If an existing off-row LOB column is moved in-row as part of an update and/or subsequent migration, the movement of the off-row LOB column to in-row can be done to the new row version created after the row is cached in the IMRS 210.

If an inserted row in the IMRS 210 contains only in-row LOB columns, then a delete can be performed normally (e.g., as described herein). However for deletion of a migrated row, if it includes only in-row LOB columns, the counterpart row in the page-based storage 320 may be deleted through walking back all the off-row LOB columns and deallocating their page chains. As the row in the IMRS 210 may no longer have off-row LOB columns, whereas the original may have had several, an optimization can be provided to carry-forward the state of each LOB column which was off-row when the row was migrated to the IMRS 210. This can be used to correctly and efficiently drive the page deallocation of those LOB columns which were off-row before migration.

Another scenario can be where the in-memory row has some off-row LOB columns and off-row LOB values in the counterpart page-based storage 320 row. This can arise when a row with off-row LOB values are migrated to the IMRS 210, followed by updates that bring the off-row values in-row, followed by more updates which cause these in-row values to be migrated off-row. Deletion of such a row from the IMRS 210 can require deallocating the off-row page chains of the latest version of the row, along with deallocating the off-row page chains of the page-based storage 320 counterpart version of the row.

Another scenario can be where frequent updates to an in-memory row produce multiple intermediate, uncommitted versions with off-row LOB chains for some columns and not for others, where the LOB values may toggle from off-row to in-row across update versions. Then the row can be deleted within the same transaction. Intermediate updates to an off-row LOB column can be performed as a delete and/or insert, so the page-deallocation of off-row LOB columns in older versions can be done in-line with the statement. The memory reclamation of these intermediate versions can be performed via garbage collection 280, which can hand off the FTP handle for embedded off-row columns to another LOB page deallocation background thread.

Garbage Collection 280

Keeping older versions can be beneficial, as certain procedures can be provided which require a version of a row which is not the latest. Additionally, memory can be optimized by avoiding row forwarding, which can cause holes in memory because a new image of a row may not be exactly the same size as an old image of the row. Instead, new rows can be added for updates of existing rows, which can reduce the number of cache invalidations. Further, avoiding in-place updates can aid in rollback of a transaction without requiring the transaction log 380.

However, in some aspects, without garbage collection 280, the IMRS 210 may eventually run out of memory and/or become unusable. Support for garbage collection 280, can be provided for IMRS-enabled databases. Garbage collection 280 can be configured to free up pieces of memory which are no longer required, such as rows, row versions, metadata for a row, pages, transactions, and/or the like. Additionally or alternatively, garbage collection 280 can free up space occupied by data in-memory which can be marked as cold, which can provide space for hot or otherwise warmer data to be stored within the IMRS 210.

In some aspects, garbage collection 280 should not consume processing power trying to visit each piece of allocated memory to check whether the data stored has become obsolete, as this can bring down the overall throughput of the SA 200. If the garbage collection 280 is able to free up space as soon as it becomes obsolete, then wasted space in the IMRS 210 can be reduced. With less wasted space, more hot data can be pulled into the IMRS 210 which can increase the overall throughput of the SA 200.

As described herein, IMRS 210 rows may be modified by creating a newer version for the row, while still maintaining older version(s) of the row, which can be linked through a list, such as a singly linked list which links all (existing) versions of a row. In some implementations, rows can have an immutable in-memory header structure, off of which hangs multiple in-memory versions, the memory for which may be periodically reclaimed. Additionally or alternatively, each version can have its own data row buffer to facilitate easy reclamation of version memory via garbage collection 280.

Dump/Load Support

Full support for dump database, load database, and/or load transaction operations can be provided for IMRS-enabled databases. In some implementations, cumulative database dump operations may not be supported. The activity generated by the Pack thread, or the equivalent use of the IMRS_PACK built-in, can be also fully recoverable from transaction log dumps.

A database dump operation on an IMRS-enabled database can dump the database contents plus the contents of the ODRS (e.g., the IMRS log 370). Successive transaction dump operations can dump the portion of the system log 380 that are newly generated plus the delta portion of the IMRS log 370. However, due to log truncation issues in the ODRS, the size of the IMRS log 370 that is captured in each transaction dump operation archive may be larger than the corresponding the system log 380 portion. Therefore, it is possible that transaction log dumps in an IMRS-enabled database may be larger than the same transaction log dump size for a similar non-IMRS 210 database for the same concurrent OLTP workload. Full recoverability can be ensured through a load database operation followed by loading the transaction dumps in sequence.

For database dump operations, the contents of the entire database can be saved to an archive using database dump operation(s). The set of pages containing database data, and transaction logs can be saved. For an IMRS-enabled databases, database dump operations may not save the in-memory contents of the IMRS 210, but only the log records saved in IMRS log 370. After an initial database dump operation, the periodic changes applied to the database can be saved using just the transaction logs, through an operation known as a transaction dump operation. Several transaction logs can be collected using a series of such transaction dump operations. In comparison to a database dump operation, periodically saving the transaction log can be a much faster operation (in amount of time taken) and in the amount of archive data generated. As an example, for a 200 GB database, periodically dumping the transaction log every ten minutes may generate only about few GBs of archive data, which makes managing load transaction operations easier.

Load database and/or online database operation: The process of restoring a database from archives collected using database dump and/or transaction dump operations can work as follows: (A) a load database operation restores the contents of the entire database from an archive generated earlier using database dump operation(s). After the contents are restored, the database is recovered using the transaction logs contained in the dump. The database can be offline and/or can be brought online using an online database operation, which completes the undo phase of recovery processing. (B) Periodic changes that are archived using transaction dump operations can be recovered using load transaction operations. The database contents are initially loaded using a load database operation, and one or more transaction logs can be loaded back in sequence using load transaction operation(s). Each load transaction operation can perform redo-recovery of the contents in the transaction log loaded. Finally, after the required number of transaction logs are loaded, the database can be brought online using online database operation(s).

Index 330

Figure 8:
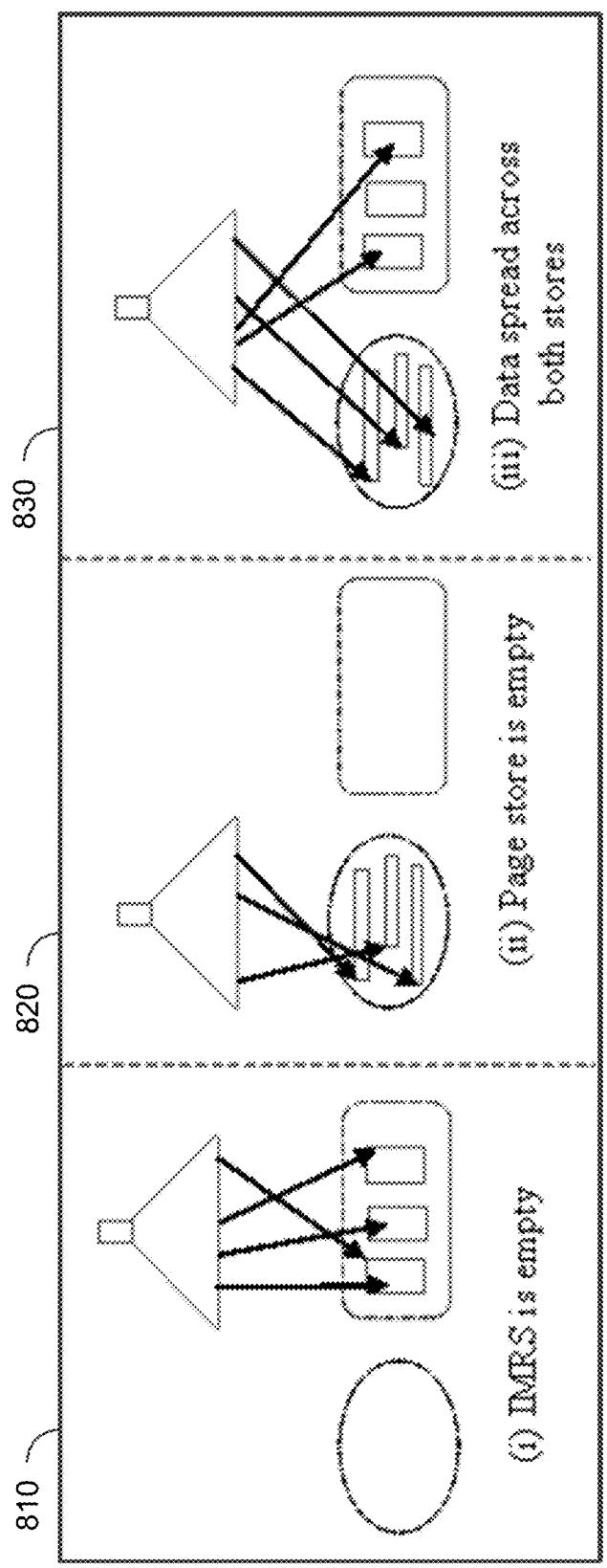
FIG. 8 illustrates example layouts/forms of a B-tree index spanning a page-based storage and IMRS, in accordance with some example implementations.

In some aspects, a B-tree index storage structure can be adopted/leveraged for features described herein, such as DRC 222. The index layer can be a fully-logged page-based and recovered index, providing access to rows either in the page-based storage 320 or the IMRS 210. FIG. 8 illustrates example layouts/forms 810-830 of a B-tree index spanning a page-based storage 320 and IMRS 210, in accordance with some example implementations. A few different combinations can arise, as described herein.

Form 810 can arise when an existing table with an index is enabled for DRC usage. Existing rows continue to remain in the page-based storage 320, and the IMRS 210 for this table is currently empty. The index leaf rows span just the rows in the page-based storage 320.

Form 820 can arise when an empty table is enabled for IMRS 210 usage, then new data is inserted to the table. All new inserts may go to the IMRS 210. Subsequently, when an index is built (or if there was a previously existing index on the empty table), the index now spans just the rows in the IMRS 210.

Form 830 can occur for an IMRS-enabled table to which new rows are inserted or existing rows are migrated from the page-based storage 320 to the IMRS 210. Row migration can happen when the Data Row Caching schemes are triggered based on some heuristics which cause rows that are frequently scanned or updated (e.g., "hot" rows) to be migrated from the page-based storage 320 to the row store. Over time, the index can span rows residing in both stores.

Row Migration can be a technique offered by the storage layer. Rows that are frequently scanned and/or updated may be relocated from the page-based storage 320 to the IMRS 210. The index entries for such rows can remain unchanged, but while scanning the data rows via the index, the RID mapping table 270 can be consulted to find the new location of the row. Future updates to the row are then performed in the IMRS 210. After row migration, two "copies" of the row may exist in the database, but once migrated, the latest version of a row may be known to be in the IMRS 210. Row migration as an access layer feature can aid in enabling the overall DRC 222 offering. For frequently scanned rows, row migration can be employed again to move the row to the high-performance IMRS 210, resulting in what can be referred to as "cached rows".

Cached Index 440

Figure 9:
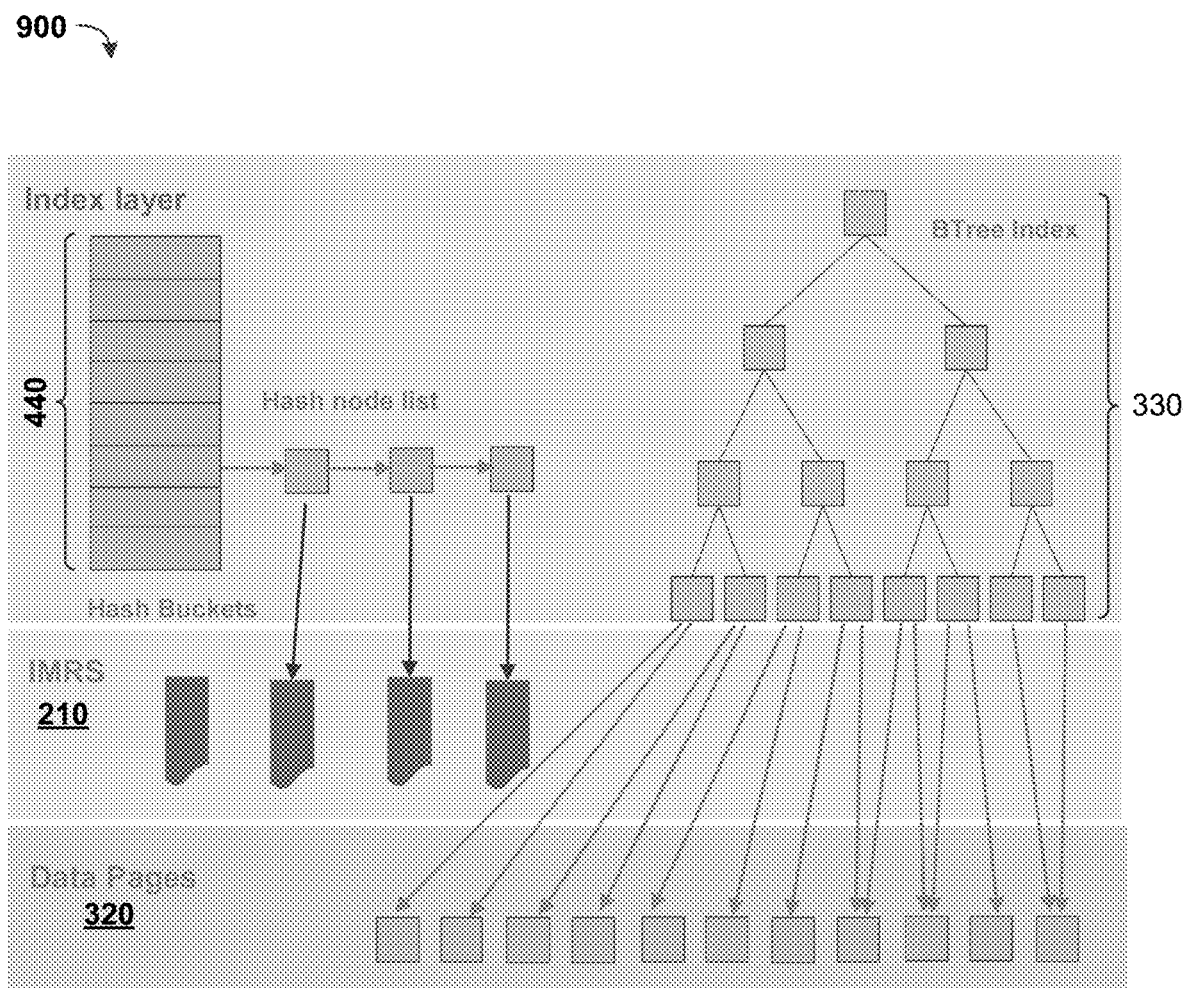
FIG. 9 illustrates a comparison of an index compared to a cached index, in accordance with various implementations.

In some aspects, a cached index 440 can be used to speed up access to rows stored in the IMRS 210. FIG. 9 illustrates a comparison 900 of a B-tree index 330 (although other index structures may be used) to a cached index 440, in accordance with various implementations.

In some aspects, a cached index 440 (also referred to as a "hash cache" or "hash table") can be a table built upon a B-tree index 330, comprising a collection of buckets organized in an array. In some implementations, the cached index 440 can be stored in-memory (which may be located in a different location than the IMRS 210). A hash function can map index keys to corresponding buckets in the cached index 440. An index key in the hash buckets may be directly checked. In some implementations, the cached index 440 may only cache hot rows. This means that some rows can be found by using this cached index 440, whereas some rows might not be found. If a row cannot be found from a cached index 440, then another check can be performed using the B-tree index 330. A hash function can be any function that is used to map digital data of an arbitrary size to digital data of a fixed size. The values returned by a hash function can be referred to as hash values, hash codes, hash sums, or simply hashes.

The index 330 can assist in achieving high performance for point queries. However, in some aspects, a hash index 440 can further enhance the performance for point queries. There may be extra overheads to maintain a separate hash index. For example, hash mapping for all data records should be maintained, which can result in more memory space consumption. In some aspects, locking, logging, and/or other mechanisms may be required to guarantee ACID compliance, which can affect the concurrency and scalability of the system. To relieve the overheads, "index hash caching" functionality can be provided to a disk-based B-tree index 330, which may only be enabled on a unique index on a table with IMRS 210 enabled. A B-tree index with this feature enabled can include a disk-based B-tree index and an additional, in-memory lock-free hash table. In some aspects, only data records accessed by point queries are indexed using cached indices 440, which can helps reduce the memory footprint. Changes to a cached index 440 can be done using compare-and-swap (CAS) without performing locking and logging, which can help improve concurrency and/or avoid contention. Cached indices 440 can also be optimized to be cache conscious.

A cached index 440 can be used for equality comparisons, such as queries that use the "=" or "IN" operators. Such queries can be referred to as "point queries" (e.g., queries that access one or more data rows that exactly match the search requests). Separately, "range queries" can be queries that access a range of data rows that match a search request. In some aspects, if a "index hash caching" feature is enabled, unlike the traditional B-tree index, the indices can include two parts: a disk-based B-tree index 330 and an additional in-memory lock-free cached index 440. Initially, only the B-tree index 330 might be constructed for all data records, and the cached index 440 can be built on the fly based on accessed data rows in runtime workload. Later, when these data rows are accessed again, they may be located and/or obtained quickly from the cached index 440 without having to search the B-tree index 330, which can speed up performance.

Figure 10:
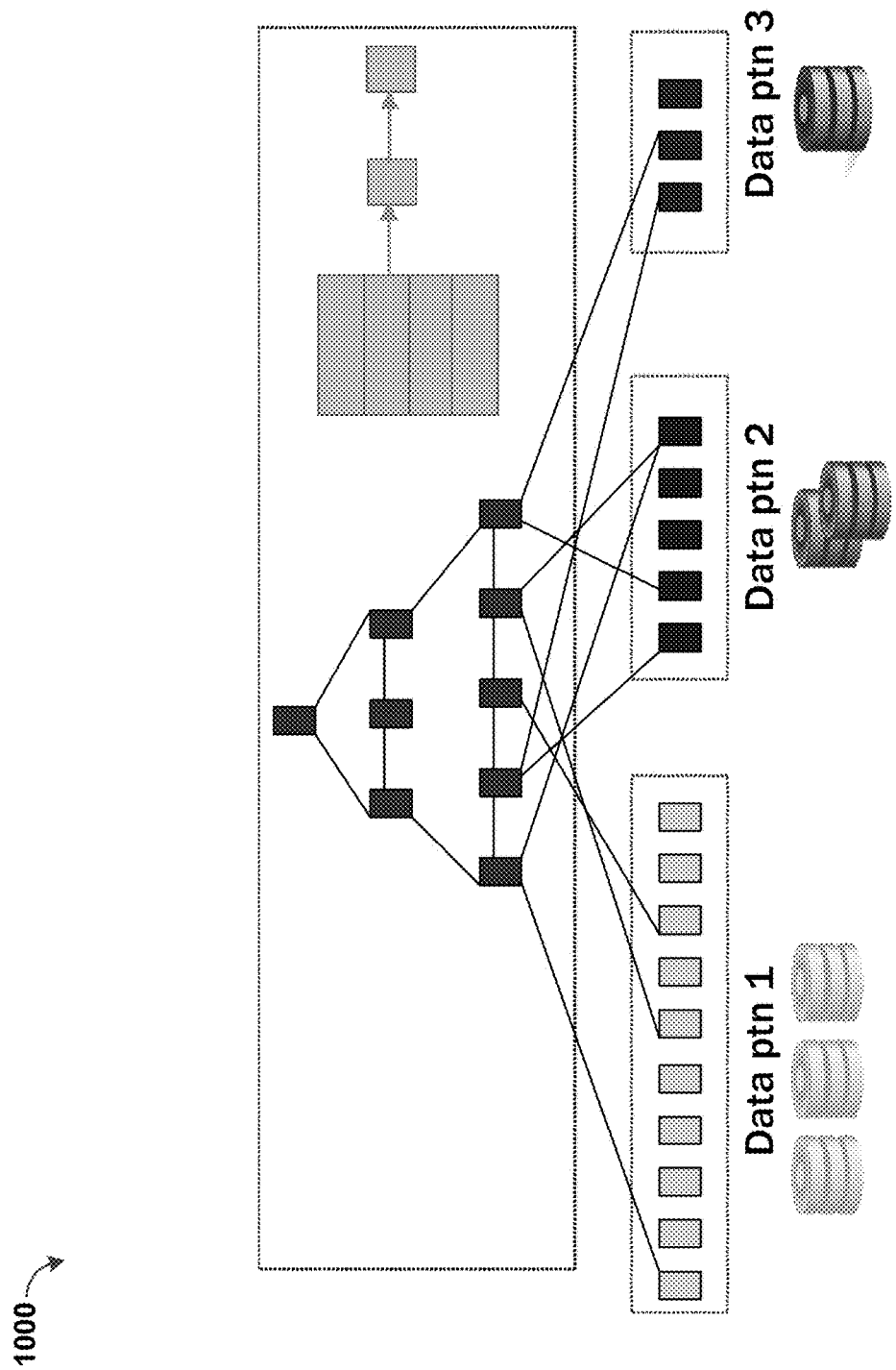
FIG. 10 illustrates the hash table for the global index (one index covers all data partitions) on partitioned table, there can be only one hash table.
Figure 11:
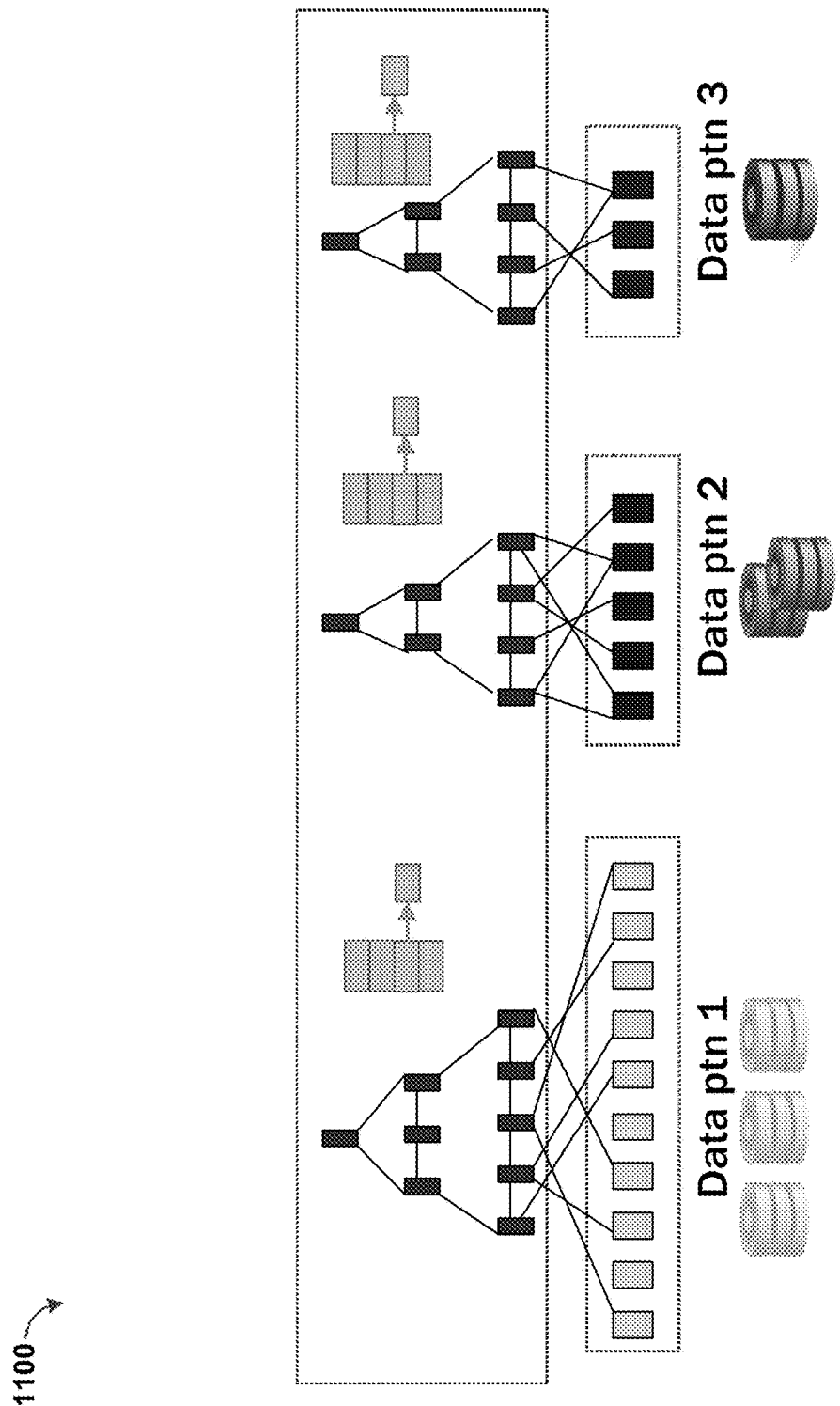
FIG. 11 illustrates the hash table for the local index (one local index covers on data partition) on partitioned table, there are there hash tables.

If a B-tree index 330 has "index hash caching" enabled, at least some (e.g., all) partitions of the B-tree index 330 may have a corresponding in-memory cached index 440. For example, if a local B-tree index 330 is created on a partitioned table with three partitions, there can be three index partitions and/or each of them may have an in-memory cached index 440. FIG. 10 shows an example of a hash table 1000 for a global index (e.g., where one index covers all data partitions) on a partitioned table, where there is only one hash table. FIG. 11 shows a hash table 1100 for the local index (one local index covers one data partition) on partitioned table, where there are three hash tables.

In some aspects, each index partition ("local" index) may have a cached index 440, whether or not uniqueness of the index partition exists and/or only covers one data partition, as there may be duplicate index keys in other partitions. Uniqueness can be guaranteed when creating an index by rule, whereas a unique "local" index might not be created if the rule can be broken. For local indices, it may be determined whether data partition keys are a subset of the index key list and/or whether the sequence of these partition keys is the same as that of the index. If both conditions are met, uniqueness can be enforced for the partitioned table. For example, with an index key list "col3, col2, col5," a data partition key list for enforcing the uniqueness can include "col3 and col5", or "col3 and col2", or "col2 and col5".

As index rows can be ordered according to an index key column sequence, if this rule is true, all data rows with the same index keys can be mapped to the same data partition, and thus uniqueness could be guaranteed. For example, a table can be created with three partitions p1, p2, p3 based on column "c1". If the value of c1<=100, this row can be inserted into p1, similar for p2 and p3. The statement can include "create table mytab (c1 int, c2 int, c3 varchar(100)) lock datarows partition by range(c1) (p1 values<=(100), p2 values<=(200), p3 values<=(300))". Now, trying to create a UNIQUE local index on column "c2" may fail, as partition key column "c1" can be not a subset Index key column list "c2". For example, the statement "create unique index idx on mytab(c2) local index" may fail.

In some aspects, once one matching hash node is found (e.g., matching on hash value/RID), the corresponding data row will retrieved and/or each column to search will be checked. If all columns match the search key, the data row will be returned and/or the search can stop (e.g., because it's a unique index and there is no second matching data row). However, in some aspects the hash table may need to be searched to find whether there is a second hash node with that matching hash value. For example, a table can have columns (c1, c2, c3), an index is created on column (c1), and rows (1, 'aaa', 1) and (11, 'bbb', 1), and an operation can be performed that includes "select . . . from table where c1=1 and c2='bbb'." If both values 1 and 11 have the same hash value (e.g., '1'), an existing hash node pointing to the first data row may be found first, but then the c2 value 'aaa' will not match. Therefore, the search may continue to find another hash node with the matching hash value (e.g., '1') pointing to the second data row, where the c2 value 'bbb' in the second data row matches. When this match is determined, this data row can be returned and the scan can stop.

Index hash caching functionality can provide effective memory space usage. For example, if hash nodes (which contain information of target data rows) are only added for only "hot data", then less memory space may be used compared to a full hash index. Index hash caching functionality can be lock-free. For example, changes to a cached index 440 can be done using CAS (compare and swap) instead of locking, so that concurrent tasks avoid blocking each other while changing and/or scanning the cached index 440. This functionality can be very important for database system scalability.

In some aspects, index hash caching functionality might not be logged. A log might not be generated when changing the cached index 440, which may not only avoid the cost of logging, but also avoid possible contentions, semaphore contention, and/or the like to help improve system performance. Index hash caching functionality can be cache-conscious. For example, in-memory structures should be able to consider cache-line misses, which can affect overall system performance greatly. Smaller structures often cause less cache-line misses than larger structures. Accordingly, the hash node size to a cache-line size can be 32 bytes (or thereabouts), which could help improve the overall performance.

In some aspects, index hash caching functionality can provide for automatic aging. In some aspects, index hash caching may only be enabled on indexes on tables with IMRS 210 enabled. Different data rows can be brought into the IMRS 210 for different workloads. From index hash caching, hash nodes may be added only for data rows that are already brought into IMRS 210 (e.g., hot rows). Later, if and when these data rows become cold, they can be packed into the page based storage 320. At that time, the corresponding hash nodes can be deleted from the cached index 440. During runtime, if a scan finds the hash chain is too long (e.g., greater than a threshold), the system may try to delete some of the existing hash nodes, which can help shorten the chain length for scanning and/or improve the scanning performance.

Index hash caching feature(s) can be enabled on B-tree indices, when creating a B-tree index 330 and/or for an existing B-tree index 330. Since the cached index 440 might not contain hash nodes for all data rows, the cached index 440 might not be created immediately when index hash caching is enabled. Instead, a cached index 440 and/or node can be created during runtime when it's needed (e.g., when the first point query comes and/or the system needs to insert a new hash node). Since a B-tree index may need to include all data rows (e.g., on a per-partition basis), it can be created and maintained when a table is created, for example.

In some aspects, since the in-memory cached index 440 may serve as a cache for the frequently accessed data rows (e.g., by using point queries), it is not a "cache" for all/most data rows, so only data rows that are likely to be accessed again should have hash nodes in it. Accordingly, rules can be defined to add hash nodes.

In some aspects, a command might not add hash nodes for the rows to insert. An insert command may insert one or more data rows and after the insert is done, some data rows may be accessed later while others may not be accessed for a long time. If an inserted row is accessed using a range query, using the cached index 440 may not be as beneficial, as it may be difficult to understand which data rows are likely to be accessed frequently in the future. If hash nodes are added for these data rows during an insert command, this may consume memory unnecessarily.

In some aspects, select and/or update commands can add hash nodes for data rows affected. For example, a point query may come from a select and/or update command like "select name from employee where ID=1000" and/or "update employee set name='John Smith' where ID=1000". If a data row is accessed and/or updated, it's likely it will be accessed again, so in this case, a hash node can be added for this data row when it's first accessed.

Various steps can be performed in order to add a new hash node. For example, in some aspects, when point query is received and/or processed, the in-memory cached index 440 may be searched for one or more rows required to execute the point query. If a matching hash node is found (e.g., a hash node with matching a hash value and/or index key), the one or more data rows may be fetched from the IMRS 210 and/or returned (e.g., to a client device), such as by using a row identifier saved in the matching hash node. If a hash node with the same hash value is found but the index key does not match, then a response may be returned (e.g., to the client device) indicating that there is no matching row in the table. Otherwise, it's possible that a hash node for the matching data row is not in the cached index 440, so a B-tree index 330 may be searched next. If a matching index row within the B-tree index 330 page is found, then a hash node for the target data row can be added into a cached index 440 with data row information (e.g., hash code, data row identifier, and/or the like), which may be saved in the qualified B-tree index 330 row. If no matching index row is found in a B-tree index 330 page, then an indication (e.g., "NONE") that no matching data row is in the table can be returned (e.g., to the client device).

In order to maintain the cached index 440, hash nodes can be deleted under certain circumstances. For example, in some aspects, when a data row is deleted by a delete command, the corresponding hash node can be deleted. In some aspects, when a data row is packed from the IMRS 210 to page-base storage 320 (e.g., when the data row is not frequently accessed anymore), the corresponding hash node can be deleted. In some aspects, when a scan (e.g., database scan or table scan) determines that it has traversed too many hash nodes (e.g., 64 hash node) before finding a matching one, hash nodes can be removed. For example, one or more (e.g., two) hash nodes from the beginning of a hash node chain and/or the last hash node outside of the threshold (e.g., a 65$^{th}$ hash node when 64 hash nodes is set as the threshold) can be removed. This procedure can help to improve system performance, as each hash node may be saved in random access memory, and too much random access memory may cause additional cache-line misses. In some aspects, when a data partition is dropped or truncated, the entire in-memory cached index 440 for the index partition that covers this data partition can be deleted. In some implementations, when the index is rebuilt, the in-memory cached index 440 for each index partition can be deleted and/or be rebuilt in the following workload.

In some aspects, the cached index 440 can be a lock-free cached index 440. Accordingly, it is possible that deleted hash nodes may be accessed by other active tasks. Therefore, deleted hash nodes may be placed into a specific "deleted hash node chain" for later garbage collection instead of freeing the memory directly. This can help to avoid access problems, as the hash node may remain available for longer.

Figure 12:
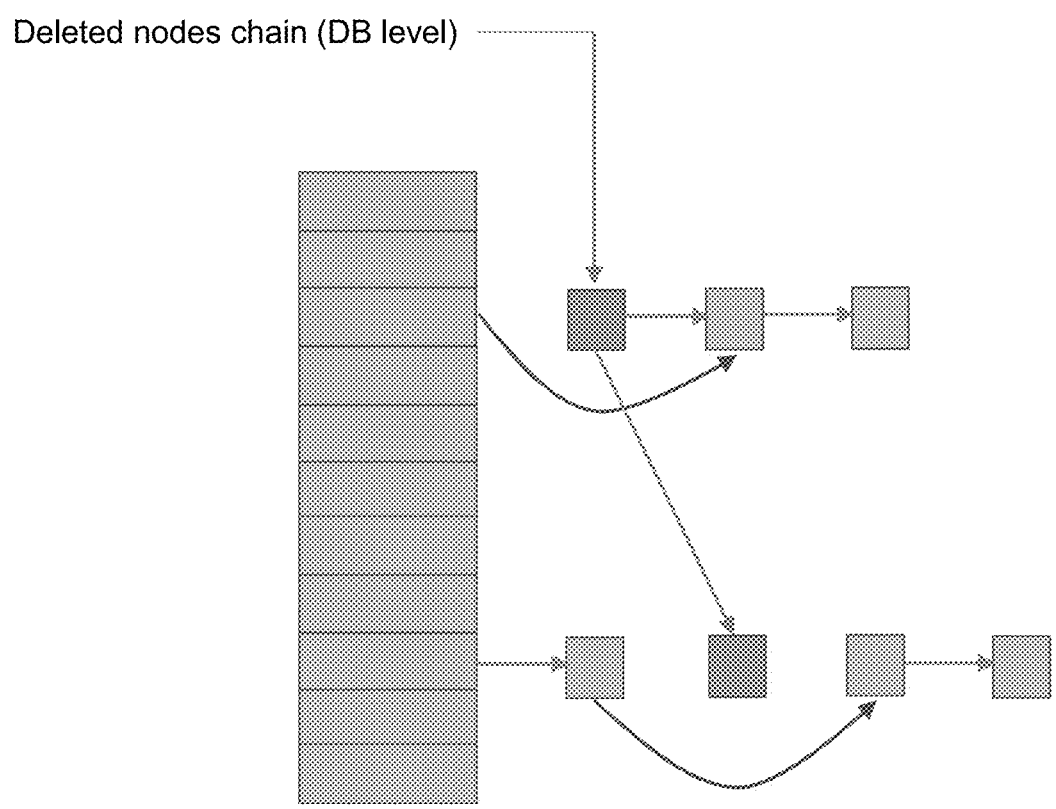
FIG. 12 illustrates an active hash node chain compared to a deleted hash node chain.

FIG. 12 shows an example of an "active hash node chain" compared to a deleted hash node chain. Although changes to a cached index 440 might not be logged, the B-tree index 330 portion may be fully logged, so a recovery of a cached index 440 can be triggered by the rollback of index row changes.

During runtime, a transaction may rollback if an error occurs. In some implementations, a cached index 440 and/or hash node can be modified (e.g., cleared and/or rolled back) if the insertion or updating of a data row is rolled back, which can help to ensure there are no hash nodes pointing to data rows with uncommitted changes (e.g., after a transaction rollback). A simple example of a transaction rollback can include execution of the following statements:

begin tran mytran
 go
 insert into employee (id, name) values (1000, "John Smith")
 go
 insert into employee (id, name) values (1001, "Peter")
 go
 select*from employee where ID=1000
 go
 rollback tran
 go The point query (e.g., select operation) can add a hash node for the row accessed, as this data can be considered transactionally active. The steps of a transaction rollback can include one or more of:

(1) Undoing the insert command of index entry for the second row (ID 1001) from the B-tree index 330 and/or deleting the matching hash node if it is found from the cached index 440 (although, one may not exist in this example).

(2) Undoing the insert command of the second data row.

(3) Undoing the insert command of the index entry for the first row (ID 1000) from the B-tree index 330 and/or deleting the matching hash node if it is found from the cached index 440 (the matching hash node for this row can be found and deleted for this row in this example).

(4) Undoing the insert command of the first data row.

After the transaction rollback is done, the inserted data row, index row, and/or hash nodes may be deleted.

When the SA 200 restarts, older cached indices 440 may be lost, and might not be recovered like a traditional full index that covers all data rows (e.g., one or more B-tree indices 330). Instead, cached indices 440 may be rebuilt on the fly, such as based on accessed data rows in the workload.

In some aspects, a cached index 440 can utilize open addressing. In some aspects, a linked list chain can be utilized for a cached index 440. For example, a hash code may be calculated based on the keys to search and/or the calculated hash code can be used to calculate a value for a bucket of the cached index 440, where work on a linked list of cached indices 440 can occur. In a "base" cached index 440, a pointer to the address of the first hash node of the linked list can be saved in the bucket. In some implementations, in a 64-bit machine, a pointer can be 8 bytes, so the required memory for a single hash table can be "Hash table memory=8 (pointer size on 64 bit system)*number of hash buckets".

In order to reduce collision, the number of hash buckets used ("hash count") can be increased. It can be challenging to allocate a large amount of memory at once in a system with active workloads. Further, even if the memory is allocated, if only some of the buckets are used, then there may be wasted memory. For example, in some implementations, the maximum number of hash values can be 4 billion, which means 4 billion can be used as the bucket count. In this case, the required memory for hash buckets can be 32G (8*4G).

Figure 13:
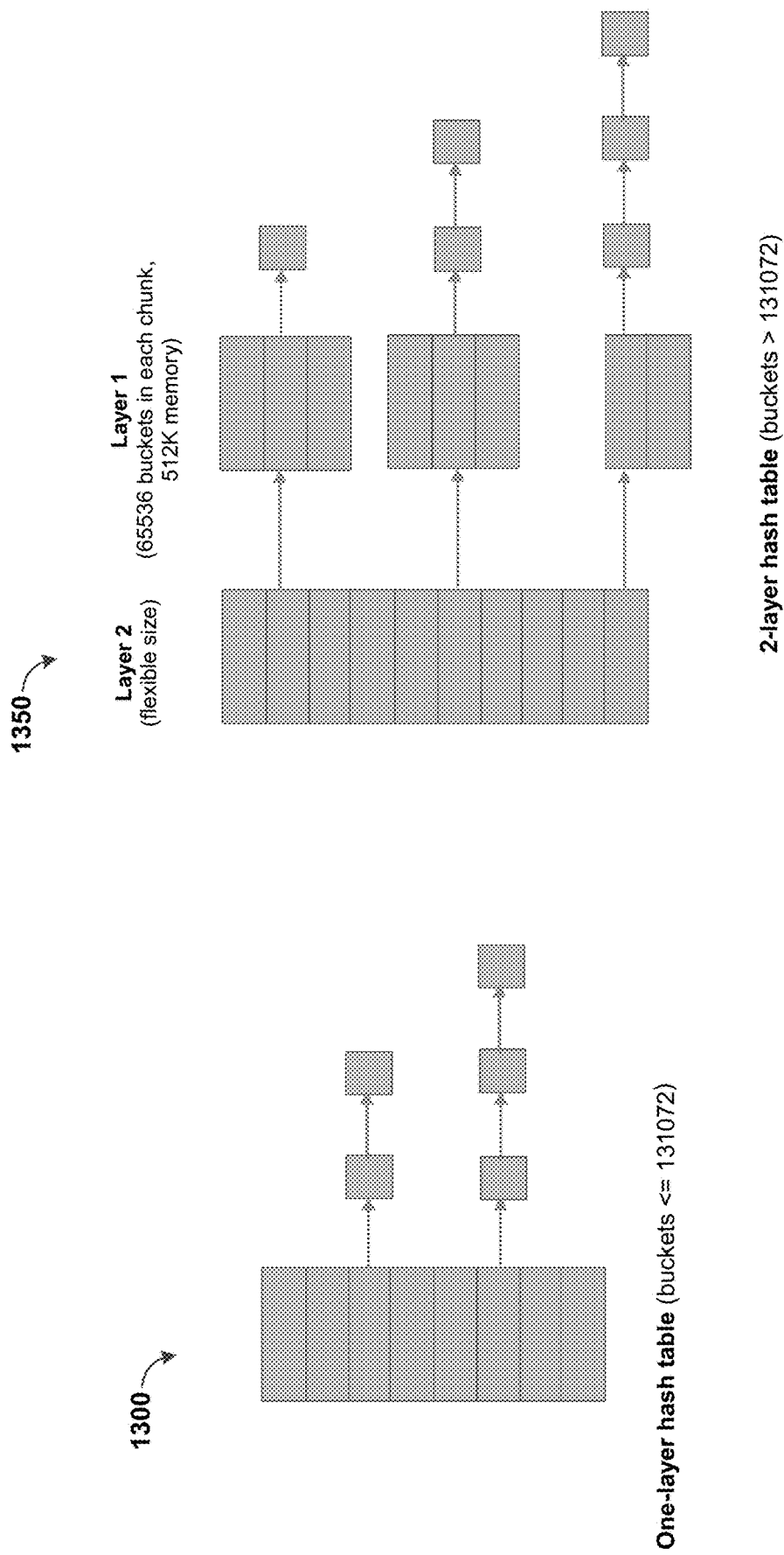
FIG. 13 illustrates hash tables with differing numbers of layers, in accordance with various implementations.

FIG. 13 shows cached indices 440 with differing numbers of layers, in accordance with various implementations. In some aspects, in order to manage and use memory efficiently, if a hash bucket count is equal or less than a threshold value (e.g., 131072, which is a $2^n$ value), then all of the memory needed for hash buckets can be allocated at once. Additionally or alternatively, if the hash bucket count is greater than a threshold value (e.g., 131072), then hash buckets can be split into chunks, where each chunk (except for possibly the last bucket) may contain a fixed number of buckets (e.g., 65536).

In some implementations, when a cached index 440 is initially created, only memory used by layer-2 and/or the chunk of bucket(s) in layer-1 that target layer-2 hash buckets belongs to is allocated. Later, when a new hash node is added, if the target hash bucket for the new hash node already has memory allocated (e.g., but unused), then the target hash bucket may be used directly. Otherwise, additional memory can be allocated for the bucket chunk that the target hash bucket belongs to. In this case, only small piece of memory (up to 512K) needs to be allocated at one time, which can provide for easy and memory-conscious database management.

It can be important to decide what should be saved in a hash node, as smaller structures can cause less cache line miss than the larger structures. In some aspects, less cache line misses can improve performance. In some aspects, only a small amount of information might be held in a hash node, which can formatted to be the same size of a cache line size (e.g., 32 bytes). For example, the fields in a hash node structure can include one or more of:
  A pointer to the next hash node in active list, which can be 8 bytes in length;
  A pointer to the hash next node in the garbage collection list, which can be 8 bytes in length;
  A RID for a row addressed by the hash node, which can be 8 bytes in length;
  A timestamp of the last time the hash node was updated, in case of the node is inserted or deleted, which can be 4 bytes in length; and
  A hash value calculated based on an input value (e.g., index key), which can be 4 bytes in length.

If more than one hash node is mapped to the same bucket (e.g., based on the calculated hash value), this can be referred to as a collision. Hash nodes which "collide" can be linked together to form a linked list, which can be referred to as a hash node chain. In some implementations, all hash nodes in the same hash node chain can be linked in order by hash value and/or RID. In related implementations, a new hash node may need to be inserted in the proper place in the hash node chain to keep the order. If several hash nodes are inserted at the same time, the changes to different places in the hash node chain can be distributed to reduce conflicts (e.g., compared to solutions that insert new hash nodes to the beginning or end of a hash node chain). Additionally, linking hash nodes in this manner can help a scan of a hash node chain stop earlier and/or avoid unnecessary checks. For example, if the hash nodes are linked in order, the scan can stop immediately after finding that the next hash node's hash code and/or RID is greater than the search request, without having to check all hash nodes in the chain to determine that the hash node does not exist.

After a cached index 440 is created, hash node inserts and/or hash node deletes can be performed without locking (e.g., via spinlock or any other kinds of lock), and CAS can be used to perform changes. CAS can be an atomic instruction used in multithreading to achieve synchronization. CAS can compare the contents of a memory location to a given value and, if they are the same, modify the contents of that memory location to a new given value. This can be done as a single atomic operation. The atomicity can help to guarantee that the new value is calculated based on up-to-date information. If the value has been updated by another thread in the meantime, the write will fail based on this check.

As mentioned above, when hash nodes are deleted, they can be put into deleted hash node chains of the database they belong to. Later, the memory they occupy can be freed by database-level system garbage collection task(s) when they are not accessed by active tasks anymore, for example. In some aspects, these garbage collection tasks can be specific to the cached index 440 and/or referred to as hash cache garbage collector tasks. Such a garbage collector task can be created as a system service in the background, such as when an "index hash caching" feature is first enabled.

In some implementations, before accessing a cached index 440, tasks in the database may need to register themselves using a database-wide timestamp (whose value continually increases). After a command is done, tasks may also need to deregister themselves. In some aspects, when a hash node is deleted, a timestamp can be saved indicating the time it was deleted or marked for deletion. Later, when a transaction in the database commits, a garbage collector task may be assigned the timestamp of the earliest task registered in the database. Thereafter, the garbage collector task can traverse the deleted hash nodes chain and free memory of hash nodes which were marked as deleted before this timestamp.

Low-level APIs for in-memory cached index 440 operations using CAS can include a cached index 440 search, an insert hash node function, and/or a delete hash node function. FIG. 14 illustrates pseudo-code 1400 of a hash table searching function, in accordance with various implementations. The illustrated "hcb_find( )" can be the internal function to search the in-memory cached index 440 with a given hash value, and may return the following information:
  (1) The current hash node that the search stops at;
  (2) The previous node of current hash node; and
  (3) An indication of the status of the search, which can include bits defined have various meanings such as an indication that that the bucket is empty (e.g., where previous node value and/or current node value are NULL), an indication that the bucket is not empty but the search key is behind the last node of bucket (e.g., where previous node value is not NULL), and indication that the bucket is not empty but the search key is smaller than the first node (e.g., where previous node value is NULL and/or current node value is the first node), and/or an indication that the hash value logically matched in the page. In some implementations, if a RID is included in the comparison, the indication that the hash value logically matched can also mean that the RID matched as well. In some implementations, the indication of the status can be represented by two bits.

FIG. 15 illustrates pseudo-code 1500 for inserting a hash node, in accordance with various implementations. The illustrated "hcb_insert( )" can be the internal function to insert a new hash node into the in-memory cached index 440. Given a data row and/or it's identifier (RID), the insert function can insert a new hash node in a proper place of the hash node chain and/or keep all hash nodes in that hash node chain in order (e.g., by hash value, data row ID).

FIG. 16 illustrates pseudo-code 1600 for deleting a hash node, in accordance with various implementations. The illustrated "hcb_delete( )" function can be the internal function to delete a hash note. Given a data row and/or its RID, detach a hash node from hash node chain and/or put the hash node into a garbage collection list. Later, the memory occupied by the hash node can be freed by a separate garbage collection task.

Figure 17:
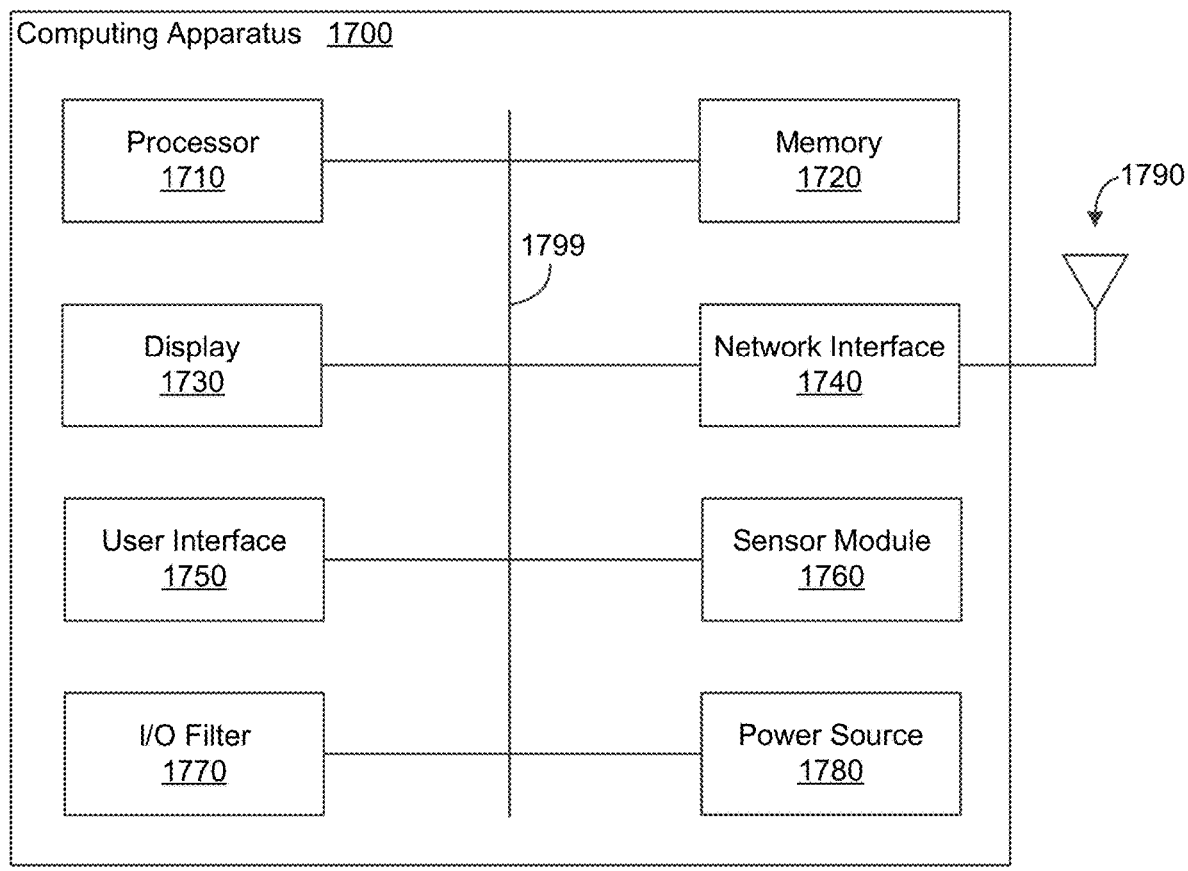
FIG. 17 illustrates an example computing apparatus, in accordance with some example implementations.

FIG. 17 illustrates an example computing apparatus 1700 which may be used to implement one or more of the described devices and/or components, in accordance with some example implementations. For example, at least a portion of the computing apparatus 1700 may be used to implement at least a portion of the computing device 110, an apparatus providing the database 120, an apparatus providing the external software 130, one or more of the user access devices 140, an access device 165, and/or the like. Computing apparatus 1700 may perform one or more of the processes described herein.

As illustrated, computing apparatus 1700 may include one or more processors such as processor 1710 to execute instructions that may implement operations consistent with those described herein. Apparatus 1700 may include memory 1720 to store executable instructions and/or information. Memory 1720 may include solid-state memory, solid-state disk drives, magnetic disk drives, or any other information storage device. In some aspects, the memory 1720 may provide storage for at least a portion of a database (e.g., the database 120 or some other organization of data). Apparatus 1700 may include a network interface 1740 to a wired network or a wireless network, such as the network 160 of FIG. 1. Wireless networks may include Wi-Fi, WiMAX, and cellular networks (2G/3G/4G/5G), and/or any other wireless network. In order to effectuate wireless communications, the network interface 1740, for example, may utilize one or more antennas, such as antenna 1790.

Apparatus 1700 may include one or more user interface, such as user interface 1750. The user interface 1750 can include hardware or software interfaces, such as a keyboard, mouse, or other interface, some of which may include a touchscreen integrated with a display 1730. The display 1730 may be used to display information to a user, provide prompts to a user, receive user input, and/or the like. In various implementations, the user interface 1750 can include one or more peripheral devices and/or the user interface 1750 may be configured to communicate with one or more peripheral devices.

In some aspects, the user interface 1750 may include one or more sensors and/or may include an interface to one or more sensors. The operation of these sensors may be controlled at least in part by a sensor module 1760. The apparatus 1700 may also comprise and input and output (I/O) filter 1770, which can filter information received from the sensors or other user interfaces 1750, received and/or transmitted by the network interface 1740, and/or the like. For example, signals detected through sensors can be passed through the I/O filter 1770 for proper signal conditioning, and the filtered data may then be passed to the sensor module 1760 and/or processor 1710 for validation and/or processing. The apparatus 1700 may be powered through the use of one or more power sources, such as power source 1780. As illustrated, one or more of the components of the apparatus 1700 may communicate and/or receive power through a system bus 1799.

Figure 18:
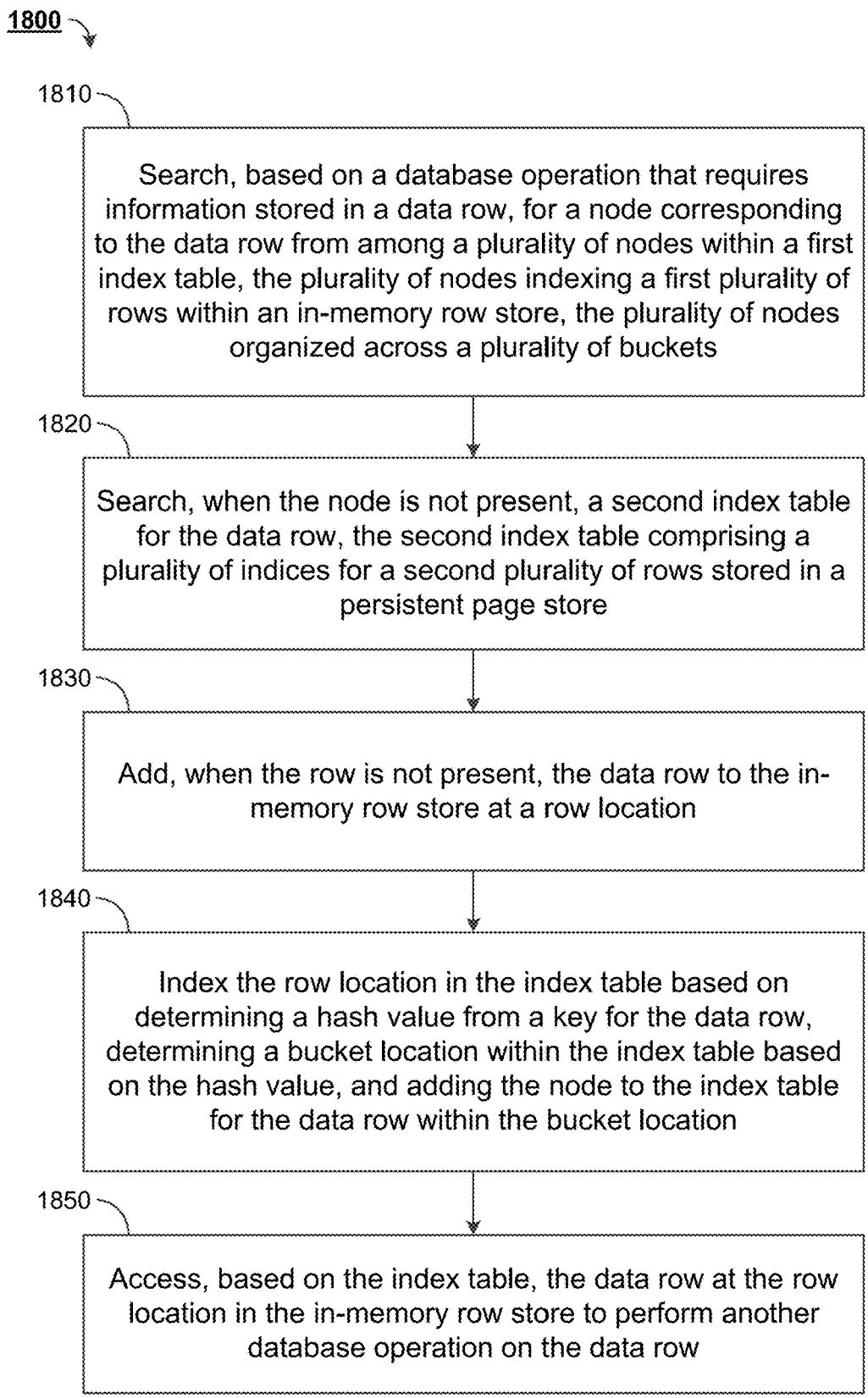
FIG. 18 illustrates an example of a method for maintaining an in-memory row storage architecture, in accordance with some example implementations.

FIG. 18 illustrates a flowchart of a method for an in-memory row storage architecture, in accordance with some example implementations. In various implementations, the method 1800 (or at least a portion thereof) may be performed by one or more of the computing system 110, an apparatus providing the database 120, an apparatus providing the external software 130, a user access device 140, one or more of the IoT devices 150, the access device 165, the computing apparatus 1700, other related apparatuses, and/or some portion thereof. In some aspects, the apparatus 1700 may be regarded as a server.

Method 1800 can start at operational block 1810 where the apparatus 1700, for example, can search, based on a database operation that requires information stored in a data row, for a node corresponding to the data row from among a plurality of nodes within a first index table, the plurality of nodes indexing a first plurality of rows within an in-memory row store, the plurality of nodes organized across a plurality of buckets.

Method 1800 can proceed to operational block 1820 where the apparatus 1700, for example, can search, when the node is not present, a second index table for the data row, the second index table comprising a plurality of indices for a second plurality of rows stored in a persistent page store.

Method 1800 can proceed to operational block 1830 where the apparatus 1700, for example, can add, when the row is not present, the data row to the in-memory row store at a row location.

Method 1800 can proceed to operational block 1840 where the apparatus 1700, for example, can index the row location in the index table based on determining a hash value from a key for the data row, determining a bucket location within the index table based on the hash value, and adding the node to the index table for the data row within the bucket location. In some aspects the key can include one or more keys used for searching and/or may include all keys of columns on which index is built.

Method 1800 can proceed to operational block 1850 where the apparatus 1700, for example, can access, based on the index table, the data row at the row location in the in-memory row store to perform another database operation on the data row.

In some aspects, execution of at least a portion of the method 1800 can provide for uniform and/or transparent access of data (e.g., rows, tables, partitions, and/or the like) regardless of the location of the data (e.g., in-memory or in a persistent page store). Additionally or alternatively, execution of at least a portion of the method 1800 can provide lock-based standards-compliant (e.g., American National Standards Institute (ANSI) standards) transaction isolation levels, such as read-committed, repeatable reads, serializable isolation, and/or the like without loss of ACID semantics. In some aspects, execution of at least a portion of the method 1800 can provide full application and/or SQL statement compatibility, such as by not restricting access to database statements and/or queries based on the location of the data.

Although several aspects are described herein with respect to the IMRS 210, other implementations are possible. For example, other in-memory database systems can be enhanced through the use of at least some of the techniques described herein.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic input, speech input, tactile input, and/or the like. Other possible input devices include touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
   at least one processor; and
   at least one memory storing instructions which, when executed by the at least one processor, cause operations comprising:
   adding, based on a database operation, a data row to an in-memory row store at a row location, wherein the database operation comprises at least one of an insert of the data row, an update of the data row, or a selection of the data row;
   indexing the row location in a first index table and a second index table, the first index table comprising a lock-free hash index that is stored in-memory to provide an index for the in-memory row store and the second index table provided for a page based persistent store, the first index table comprising a plurality of nodes for a plurality of rows in the in-memory row store, the plurality of nodes organized across a plurality of buckets, the row location indexed based on:
   determining a hash value based on a key for the data row,
   determining, based on the hash value, a bucket location from among the plurality of buckets, and
   adding, within the bucket location, a node within the index table for the data row;
   in response to another database operation on the data row, accessing the data row at the row location in the in-memory row store, when the data row location is determined from the first index table comprising the lock-free hash cache; and
   in response to the another database operation on the data row and the data row location not being determined from the first index table, accessing, based on the second index, the data row at the row location in the page based persistent store.

2. The system of claim 1, wherein the node comprises one or more of:
   a pointer to a next node in list of active nodes within the bucket location;
   a pointer to a next node in a list of nodes marked for deletion within the bucket list;
   an indication of an identifier for the data row;
   an indication of a most recent time at which the node was updated; and
   an indication of the hash value.

3. The system of claim 2, wherein accessing the data row to perform the another database operation comprises:
   determining a second hash value based on the key for the data row;

searching, based on the second hash vale, for the node; and accessing, based on the indication of the identifier for the data row, the data row at the row location within the in-memory row store.

4. The system of claim 1, wherein the first index table is stored in the in-memory row store, and wherein the second index table is stored in the persistent page store.

5. The system of claim 1, wherein the bucket location comprises a linked list of nodes organized in order of row identifiers, and wherein adding the node within the index table comprises adding the node to the linked list of nodes based on:

modifying at least one node in the linked list of nodes to include a pointer to the node; or including a pointer within the node to at least one node in the linked list of nodes.

6. The system of claim 1, wherein the operations further comprise:

marking, in response to determining that the data row is not transactionally active or that the second operation comprises a delete of the data row, the node for deletion, wherein marking the node for deletion comprises placing the node into a linked list of nodes to be deleted; and deleting, based on a background thread traversing the linked list, the node from the in-memory row store.

7. The system of claim 1, wherein the operations further comprise:

determining, at a start of execution of the another database operation, a first value of information stored within the row location;

generating, based on the another database operation and the first value, replacement information;

comparing, at an end of execution of the another database operation, the first value to a second value of information stored within the row location; and updating, based on the first value being equal to the second value, the row location to include the replacement information.

8. The system of claim 1, wherein the operations further comprise:

performing, based on determining that an error affecting a database transaction comprising the database operation has occurred, a rollback of the database transaction, wherein the rollback comprises removing the data row from the in-memory row store and deleting the node from the index table.

9. The system of claim 1, wherein the operations further comprise:

determining whether a count of the plurality of buckets exceeds a threshold value; and allocating, when the count exceeds the threshold value, first memory for a first layer of buckets and second memory for a second layer of buckets, wherein each bucket within the second layer of buckets includes at least one pointer to at least one bucket in the first layer of buckets, and wherein the second memory is configured for storage of the plurality of nodes.

10. A non-transitory computer readable medium storing instructions which, when executed by at least one processor, cause operations comprising:

adding, based on a database operation, a data row to an in-memory row store at a row location, wherein the database operation comprises at least one of an insert of the data row, an update of the data row, or a selection of the data row;

indexing the row location in a first index table and a second index table, the first index table comprising a lock-free hash index that is stored in-memory to provide an index for the in-memory row store and the second index table provided for a page based persistent store, the first index table comprising a plurality of nodes for a plurality of rows in the in-memory row store, the plurality of nodes organized across a plurality of buckets, the row location indexed based on:

determining a hash value based on a key for the data row, determining, based on the hash value, a bucket location from among the plurality of buckets, and adding, within the bucket location, a node within the index table for the data row;

in response to another database operation on the data row, accessing the data row at the row location in the in-memory row store, when the data row location is determined from the first index table comprising the lock-free hash cache; and in response to the another database operation on the data row and the data row location not being determined from the first index table, accessing, based on the second index, the data row at the row location in the page based persistent store.

11. The non-transitory computer readable medium of claim 10, wherein the node comprises one or more of:

a pointer to a next node in list of active nodes within the bucket location;

a pointer to a next node in a list of nodes marked for deletion within the bucket list;

an indication of an identifier for the data row;

an indication of a most recent time at which the node was updated; and an indication of the hash value.

12. The non-transitory computer readable medium of claim 10, wherein accessing the data row to perform the another database operation comprises:

determining a second hash value based on the key for the data row;

searching, based on the second hash vale, for the node; and accessing, based on the indication of the identifier for the data row, the data row at the row location within the in-memory row store.

13. The non-transitory computer readable medium of claim 10, wherein the bucket location comprises a linked list of nodes organized in order of row identifiers, and wherein adding the node within the index table comprises adding the node to the linked list of nodes based on:

modifying at least one node in the linked list of nodes to include a pointer to the node; or including a pointer within the node to at least one node in the linked list of nodes.

14. A method comprising:

adding, based on a database operation, a data row to an in-memory row store at a row location, wherein the database operation comprises at least one of an insert of the data row, an update of the data row, or a selection of the data row;

indexing the row location in a first index table and a second index table, the first index table comprising a lock-free hash index that is stored in-memory to provide an index for the in-memory row store and the second index table provided for a page based persistent store, the first index table comprising a plurality of nodes for a plurality of rows in the in-memory row store, the plurality of nodes organized across a plurality of buckets, the row location indexed based on:
determining a hash value based on a key for the data row,
determining, based on the hash value, a bucket location from among the plurality of buckets, and
adding, within the bucket location, a node within the index table for the data row;
in response to another database operation on the data row, accessing the data row at the row location in the in-memory row store, when the data row location is determined from the first index table comprising the lock-free hash cache; and
in response to the another database operation on the data row and the data row location not being determined from the first index table, accessing, based on the second index, the data row at the row location in the page based persistent store.

15. The method of claim 14, wherein the node comprises one or more of:
a pointer to a next node in list of active nodes within the bucket location;
a pointer to a next node in a list of nodes marked for deletion within the bucket list;
an indication of an identifier for the data row;
an indication of a most recent time at which the node was updated; and
an indication of the hash value.

16. The method of claim 15, wherein accessing the data row to perform the another database operation comprises:
determining a second hash value based on the key for the data row;
searching, based on the second hash vale, for the node; and
accessing, based on the indication of the identifier for the data row, the data row at the row location within the in-memory row store.

17. The method of claim 14, wherein the bucket location comprises a linked list of nodes organized in order of row identifiers, and wherein adding the node within the index table comprises adding the node to the linked list of nodes based on:
modifying at least one node in the linked list of nodes to include a pointer to the node; or
including a pointer within the node to at least one node in the linked list of nodes.

* * * * *